United States Patent
Dohta

(10) Patent No.: US 8,259,107 B2
(45) Date of Patent: Sep. 4, 2012

(54) STORAGE MEDIUM HAVING STORED THEREON IMAGE PROCESSING PROGRAM AND IMAGE PROCESSING APPARATUS

(75) Inventor: Takuhiro Dohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 874 days.

(21) Appl. No.: 12/213,658

(22) Filed: Jun. 23, 2008

(65) Prior Publication Data

US 2009/0244063 A1 Oct. 1, 2009

(30) Foreign Application Priority Data

Apr. 1, 2008 (JP) .................................. 2008-95401

(51) Int. Cl.
*G06T 17/00* (2006.01)
(52) U.S. Cl. ....................................................... 345/423
(58) Field of Classification Search .................. 345/428, 345/423, 426; 382/242; 707/920; 463/31
See application file for complete search history.

(56) References Cited

U.S. PATENT DOCUMENTS

| | | | | |
|---|---|---|---|---|
| 4,679,361 A | * | 7/1987 | Yacoe | 52/81.1 |
| 5,616,079 A | | 4/1997 | Iwase et al. | |
| 6,167,159 A | * | 12/2000 | Touma et al. | 382/242 |
| 6,947,041 B2 | * | 9/2005 | Naoi | 345/428 |
| 7,327,364 B2 | * | 2/2008 | Ohba et al. | 345/426 |
| 7,362,328 B2 | * | 4/2008 | Fenney et al. | 345/423 |
| 7,783,687 B2 | * | 8/2010 | Nomura | 701/208 |
| 7,876,322 B2 | * | 1/2011 | Xie et al. | 345/428 |
| 2005/0233805 A1 | * | 10/2005 | Okajima | 463/31 |
| 2006/0132488 A1 | | 6/2006 | Lim et al. | |

FOREIGN PATENT DOCUMENTS

| | | |
|---|---|---|
| EP | 1 596 339 | 11/2005 |
| JP | 07-271999 | 10/1995 |
| JP | 3227158 | 8/2001 |
| JP | 2003-044879 | 2/2003 |
| JP | 2003-099801 | 4/2003 |

OTHER PUBLICATIONS

Laszlo Szirmay-Kalos et al., "Displacement Mapping on the GPU-State of the Art", Computer Graphics Forum, Wiley-Blackwell Publishing Ltd, GB, vol. 25, No. 3, Jan. 1, 2006, pp. 1-24, XP002631003.

(Continued)

*Primary Examiner* — Daniel Washburn
*Assistant Examiner* — Kyle Zhai
(74) *Attorney, Agent, or Firm* — Nixon & Vanderhye P.C.

(57) ABSTRACT

A virtual plane surface PL is divided into a plurality of square regions such that the closer distance to a virtual camera VP a square region is located at, the smaller areas the square region is divided into. Distance information 41 indicative of distances of respective vertices composing each of the square regions from the virtual plane surface PL is read from the internal main memory 11e. Further, coordinate points of positions, which are distanced from respective vertices, which compose polygonal shape regions included in each of the square regions, by distances indicated by the read distance information in a direction perpendicular to the virtual plane surface PL, are used as polygon vertices, which define polygons, whereby the polygons corresponding to the curved surface SF are generated. From each of the square regions, substantially a common number of polygons are generated. In this manner, appropriate polygon information of the curved surface SF which is capable of securing a drawing quality can be generated.

18 Claims, 21 Drawing Sheets

OTHER PUBLICATIONS

Renato Pajarola et al., "Survey of Semi-Regular Multiresolution Models for Interactive Terrain Rendering", The Visual Computer; International Journal of Computer Graphics, Springer, Berlin, Germany, vol. 23, No. 8, Jun. 13, 2007, pp. 583-605, XP019540971.

Bo-Yin Li et al., "Visualization for HPC Data-Large Terrain Model", High Performance Computing and Grid in Asia Pacific Region, 2004, Proceedings Seventh International Conference on Tokyo, Japan, Jul. 20-22, 2004, Piscataway, New Jersey, USA, IEEE, Jul. 20, 2004, pp. 280-284, XP010716662.

European Search Report issued for corresponding European Patent Application No. 08011124.8, dated Jan. 3, 2012.

Japanese Notice of Reasons for Rejection issued for corresponding Japanese Patent Application No. 2008-095401, dated Jun. 8, 2012.

* cited by examiner

F I G. 5
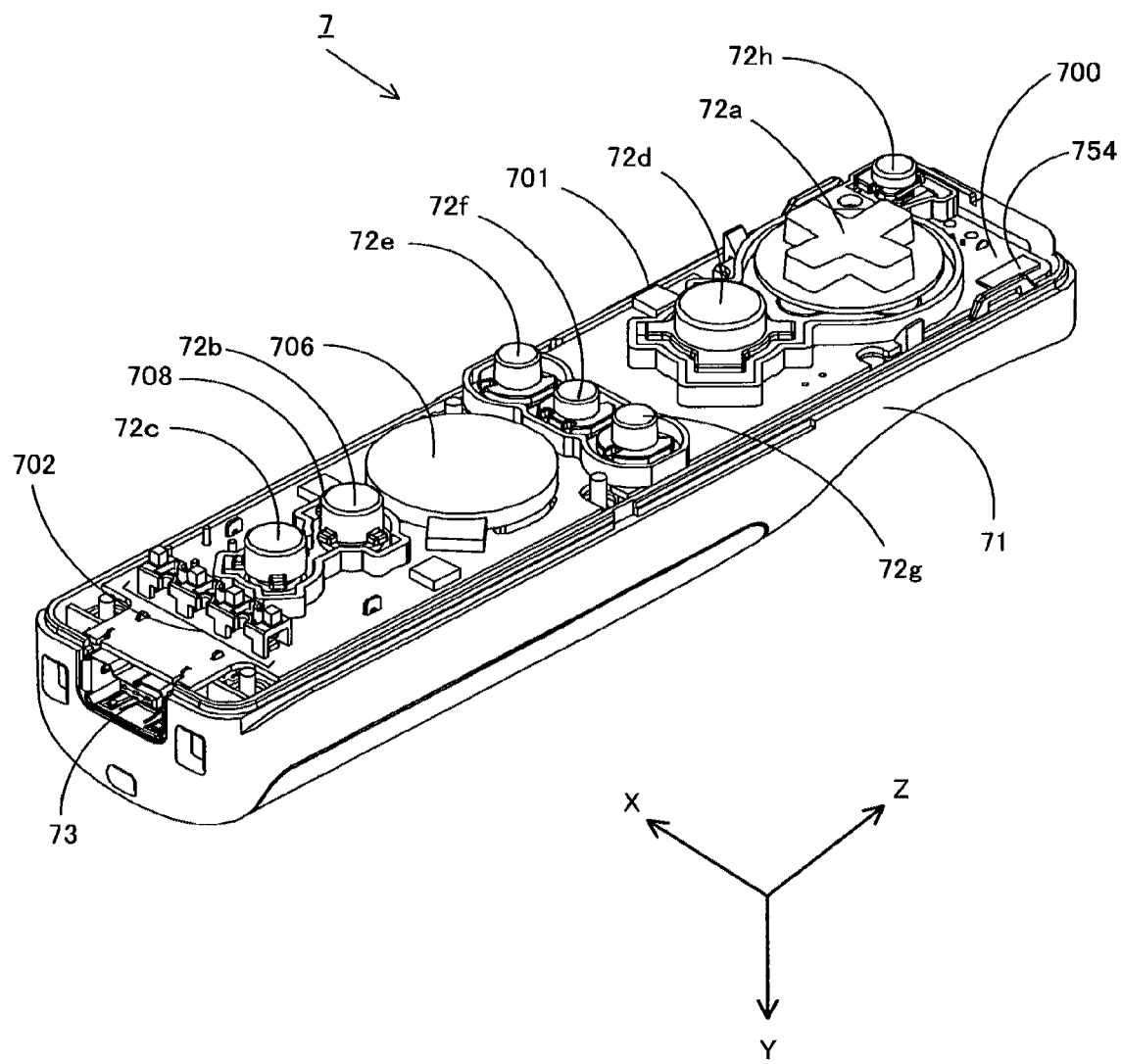

F I G. 14A
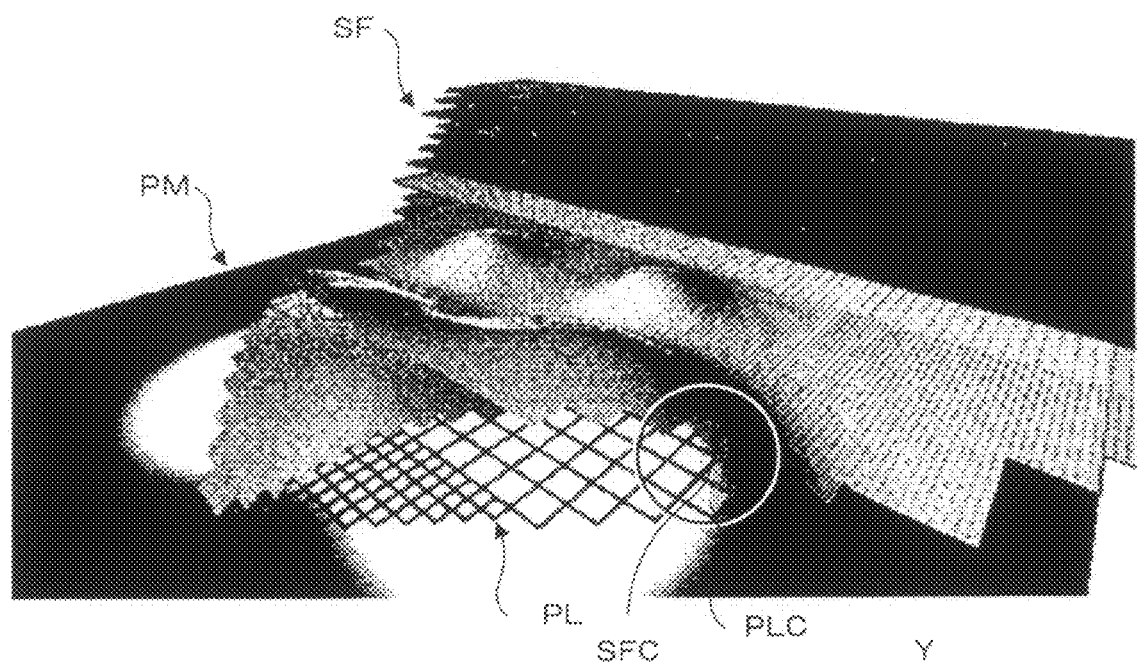
F I G. 14B
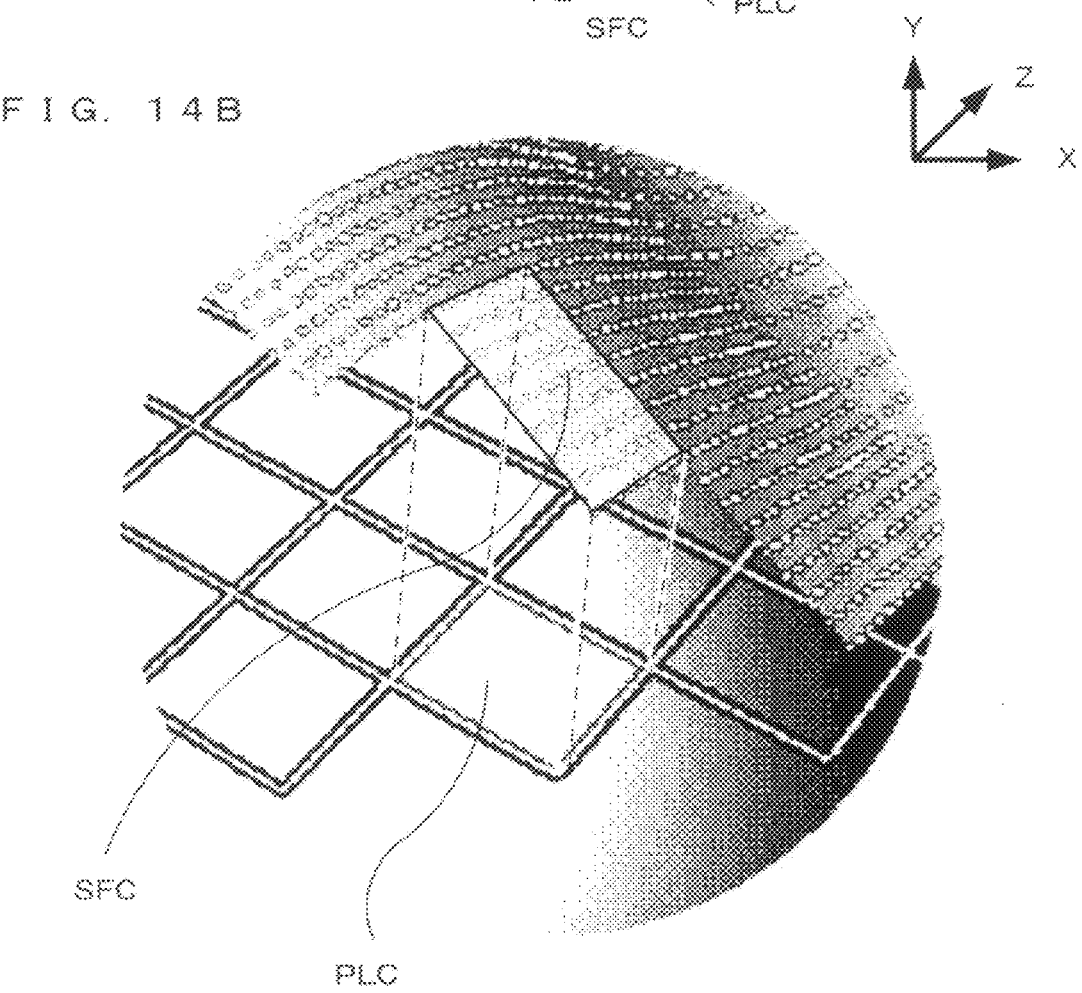

US 8,259,107 B2

STORAGE MEDIUM HAVING STORED THEREON IMAGE PROCESSING PROGRAM AND IMAGE PROCESSING APPARATUS

CROSS REFERENCE TO RELATED APPLICATION

The disclosure of Japanese Patent Application No. 2008-95401, filed Apr. 1, 2008, is incorporated herein by reference.

BACKGROUND OF THE INVENTION

1. Field of the Invention

The present invention relates to a storage medium having stored thereon an image processing program and an image processing apparatus. More particularly, the present invention relates to a storage medium having stored thereon an image processing program and an image processing apparatus which are capable of drawing an image of a curved surface (e.g., a curved surface indicative of a landform) as viewed from a virtual camera situated in a virtual three-dimensional space, an undulation of the curved surface being defined by a distance from a virtual plane surface arranged in the virtual three-dimensional space.

2. Description of the Background Art

Conventionally, when an image of a three-dimensional object as viewed from a virtual camera, the image being arranged in a virtual three-dimensional space, is to be drawn, the three-dimensional object is simply represented by image information composed of polygons, whereby the three-dimensional object is situated in the virtual three-dimensional space and the image is drawn therein. However, since the three-dimensional object is represented with a fixed degree of accuracy (that is, since the three-dimensional object is divided into polygons of a common size so as to configure a polygon model thereof), a problem is posed in that a huge amount of data needs to be processed.

In order to solve the problem, various methods, apparatus, and the like have been proposed. For example, a three-dimensional game apparatus is disclosed in which a plurality of types of division map information, which represents the three-dimensional object and which have different numbers of divisions, respectively, is stored in division map information storage means. A distance between the virtual camera and the three-dimensional object is calculated, and the division map information which has a smaller number of divisions is read when the distance becomes further (e.g., see Japanese Patent No. 3227158).

However, in the above-described three-dimensional game apparatus, since the plurality types of division map information (i.e., polygon information), which respectively have different numbers of divisions, needs to be stored in the storage means, the storage means such as a memory needs to have a large amount of capacity. Further, in the above-described three-dimensional game apparatus, if there are a greater number of types of the division map information which respectively have different numbers of divisions, an appropriate division map can be selected in accordance with the distance between the virtual camera and the three-dimensional object (i.e., a division map which is divided into a given number of divisions which are essential to secure a quality of the drawing, can be selected). However, the storage means such as the memory needs to have a further larger amount of capacity.

SUMMARY OF THE INVENTION

Therefore, an object of the present invention is to solve the above-described problem and to provide a storage medium having stored thereon an image processing program and an image processing apparatus which are capable of generating appropriate polygon information so as to secure a quality of a drawing.

The present invention has the following features to attain the object mentioned above. The reference numerals, step numbers (denoted by S, which is short for step, and numbers), drawing numbers and the like in the parentheses indicate the correspondence with the embodiment described below in order to aid in understanding the present invention and are not intended to limit, in any way, the scope of the present invention.

The present invention is directed to a computer readable storage medium (11e) having stored thereon an image processing program (40) for drawing an image of a curved surface (SF, e.g., a landform or the like) as viewed from a virtual camera (VP) situated in a virtual three-dimensional space, an undulation of the curved surface being defined by a distance from a virtual plane surface (PL) arranged in the virtual three-dimensional space.

A first aspect of the present invention is directed to a computer readable storage medium (11e) having stored thereon the image processing program (40) causing a computer (10, 11b) to execute a plane surface division step, a first distance reading step, a first coordinate point calculation step, a polygon generation step, and a drawing step. The plane surface division step (S301, S311) divides the virtual plane surface (PL) into a plurality of polygonal shape regions such that the closer a region is to the virtual camera (VP), the smaller areas the region is divided into. The first distance reading step (S407) reads, from storage means (11e, 12), distance information (41) indicative of a distance from the virtual plane surface (PL), with respect to respective vertices of the plurality of polygonal shape regions. The first coordinate point calculation step (S409) calculates coordinate points of position which are respectively distanced from the vertices composing the plurality of polygonal shape regions by distances indicated by the distance information (41), which is read in the first distance reading step (S407), in a direction perpendicular to the virtual plane surface (PL). The polygon generation step (S411, S413, S415) generates polygons by using the coordinate points calculated in the first coordinate point calculation step (S409) as polygon vertices which define the polygons, the number of the polygons being substantially constant in each of the plurality of the polygonal shape regions. The drawing step (S109) draws an image of the polygons which are generated in the polygon generation step (S411, S413, S415), the image as being viewed from the virtual camera (VP).

A second aspect of the computer readable storage medium (11e) having stored thereon an image processing program (40) is based on the first aspect of the computer readable storage medium (11e) having stored thereon an image processing program (40). In the second aspect, the plane surface division step (S301, S311) includes a size evaluation value calculation step (S307) of calculating a size evaluation value indicative of a size of an image of each of the plurality of the polygonal shape regions as viewed from the virtual camera (VP), and divides each of the plurality of the polygonal shape regions such that the size evaluation value calculated in the size evaluation value calculation step (S307) becomes equal to or lower than a predetermined threshold value. Accordingly, the image as viewed from the virtual camera (VP) can be easily divided as necessary and sufficiently to secure a quality of the image.

A third aspect of the computer readable storage medium (11e) having stored thereon an image processing program

(40) is based on the second aspect of the computer readable storage medium (11e) having stored thereon an image processing program (40). In the third aspect, the size evaluation value calculation step (S307) calculates, as the size evaluation value, an area of an image of a sphere (BA) having a great circle which is inscribed in or circumscribed around each of the plurality of polygonal shape regions, the area of the image as being viewed from the virtual camera (VP). Accordingly, an appropriate size evaluation value can be calculated easily.

A fourth aspect of the computer readable storage medium (11e) having stored thereon an image processing program (40) is based on the second aspect of the computer readable storage medium (11e) having stored thereon an image processing program (40). In the fourth aspect, the plane surface division step (S301, S311) further includes a first division step (S301), a division necessity determination step (S309), and a second division step (S311). The first division step (S301) divides the virtual plane surface (PL) into a first predetermined number of regions. The division necessity determination step (S309) determines, with respect to each of the first predetermined number of regions generated in the first division step (S301), whether or not the size evaluation value calculated in the size evaluation value calculation step (S307) is equal to or lower than the threshold value. The second division step (S311) further divides a region, among the first predetermined number of regions, whose size evaluation value is determined not to be equal to or lower than the threshold value in the division necessity determination step (S309), into the first predetermined number of regions. The division necessity determination step (S309) determines, with respect to respective regions additionally generated in the second division step (S311), whether or not the size evaluation value thereof calculated in the size evaluation value calculation step (S307) is equal to or lower than the threshold value. The plane surface division step repeatedly executes the division necessity determination step (S309) and the second division step (S311) until the size evaluation value of all the generated regions become equal to or lower than the threshold value. Accordingly, the image as viewed from the virtual camera (VP) can be easily divided as necessary and sufficiently to secure the quality of the image.

A fifth aspect of the computer readable storage medium (11e) having stored thereon an image processing program (40) is based on the fourth aspect of the computer readable storage medium (11e) having stored thereon an image processing program (40). In the fifth aspect, the first division step (S301) equally divides the virtual plane surface (PL) into the first predetermined number of regions. The second division step (S311) equally divides the region, among the first predetermined number of regions, whose the size evaluation value is determined not to be equal to or lower than the threshold value in the division necessity determination step (S309), into the first predetermined number of regions. Accordingly, since the regions are divided equally, the divisions can be performed efficiently.

A sixth aspect of the computer readable storage medium (11e) having stored thereon an image processing program (40) is based on the fifth aspect of the computer readable storage medium (11e) having stored thereon an image processing program (40). In the sixth aspect, the virtual plane surface (PL) is a quadrangular plane surface. The polygonal shape is of a quadrangular shape. The first division step (S301) divides the quadrangular virtual plane surface (PL) into quarters by two straight lines which are each formed by connecting middle points of two facing sides of the quadrangular virtual place surface (PL). The second division step (S311) divides the quadrangular region, whose size evaluation value is determined not to be equal to or lower than the threshold value in the division necessity determination step (S309), into quarters by two straight lines which are each formed by connecting middle points of two facing sides of the quadrangular region. Accordingly, since the quadrangular regions are each divided equally by the two straight lines which are each formed by connecting middle points of two facing sides of each quadrangular region, the divisions can be performed more efficiently.

A seventh aspect of the computer readable storage medium (11e) having stored thereon an image processing program (40) is based on the sixth aspect of the computer readable storage medium (11e) having stored thereon an image processing program (40). In the seventh aspect, the image processing program (40) further causes the computer (10, 11b) to execute a re-division step (S315) of dividing the plurality of polygonal shape regions, which are generated in the plane surface division step (S301, S311), into a second predetermined number of small regions which are each of a quadrangular shape. The first distance reading step (S407) reads the distance information (41) of respective vertices composing each of the quadrangular small regions, which are generated in the re-division step (S315), from the storage means (11e, 12). The first coordinate point calculation step (S409) calculates coordinate points of positions which are respectively distanced from of the vertices composing each of the quadrangular small regions generated in the re-division step (S315) by distances indicated by the distance information (41) read in the first distance reading step (S407) in a direction perpendicular to the virtual plane surface (PL). The polygon generation step (S411, S413, S415) generates polygons respectively having the coordinate points calculated in the first coordinate point calculation step (S409) as the polygon vertices. Accordingly, polygons having appropriate sizes can be generated efficiently so as to represent the curved surface (SF).

An eighth aspect of the computer readable storage medium (11e) having stored thereon an image processing program (40) is based on the seventh aspect of the computer readable storage medium (11e) having stored thereon an image processing program (40). In the eighth aspect, the polygon generation step (S411, S413, S415) includes a triangle generation step (S411) of generating two triangle polygons corresponding to two triangle regions which are obtained by dividing each of the quadrangular small regions, which are generated in the re-division step (S315), by a diagonal line therethrough. Accordingly, polygons having appropriate sizes can be generated efficiently so as to represent the curved surface (SF).

A ninth aspect of the computer readable storage medium (11e) having stored thereon an image processing program (40) is based on the eighth aspect of the computer readable storage medium (11e) having stored thereon an image processing program (40). In the ninth aspect, the re-division step (S315) equally divides each of the quadrangular regions generated in the plane surface division step (S301, S311) into an even number (6 in this case) of small regions, respectively, in two directions along adjacent sides of each of the quadrangular region. The triangle generation step (S411) includes an outer-circumference extraction step and a diagonal line selection step (FIG. 11B). The outer-circumference extraction step extracts outer-circumference small regions, from among the second predetermined number (36 in this case) of small regions, which each includes a part of sides composing each of the quadrangular regions generated in the plane surface division step (S301, S311) as at least one of sides composing each of the small regions. The diagonal line selection step selects diagonal lines for dividing the quadrangular regions, which are divided in the plane surface division step, into triangle regions, respectively. With respect to such outer-circumference small regions, among the outer-circumference small regions extracted by the outer-circumference extraction step, that include vertices composing each of the quadrangular regions generated in the plane surface division step, the diagonal line selection step selects diagonal lines including the vertices as diagonal lines for dividing the quadrangular outer-circumference small regions. On the other hand, with respect to such outer-circumference small regions, among the outer-circumference small regions extracted by the outer-circumference extraction step, that do not include the vertices composing each of the quadrangular regions generated in the plane surface division step, the diagonal line selection step selects diagonal lines for dividing the quadrangular outer-circumference small regions such that the diagonal lines of the outer-circumference small regions adjoining respectively are approximately perpendicular to each other (FIG. 11B). Accordingly, polygons which have been divided different numbers of times respectively (whose sizes are different from one another) can be connected to one another smoothly (FIG. 12).

A tenth aspect of the computer readable storage medium (11e) having stored thereon an image processing program (40) is based on the sixth aspect of the computer readable storage medium (11e) having stored thereon an image processing program (40). In the tenth aspect, the polygon generation step (S411, S413, S415) includes a triangle generation step (S411) of generating two triangle polygons corresponding to two triangle regions obtained by dividing each of the quadrangular regions, which are generated in the plane surface division step (S301, S311), by a diagonal line therethrough. Accordingly, triangle polygons having appropriate sizes can be generated so as to represent the curved surface (SF).

An eleventh aspect of the computer readable storage medium (11e) having stored thereon an image processing program (40) is based on the first aspect of the computer readable storage medium (11e) having stored thereon an image processing program (40). In the eleventh aspect, the image processing program further causes the computer (10, 11b) to execute: a field of view determination step (S303) of determining whether or not each of the polygonal shape regions generated in the plane surface division step (S301, S311) is in an out-of-view region, which is not included in the image as viewed from the virtual camera (VP); and a region exclusion step (S305) of excluding a region, among the polygonal shape regions generated in the plane surface division step (S301, S311), which is determined to be in the out-of-view region in the field of view determination step (S303), from target regions which are subject to processing in the first distance reading step (S407), the first coordinate point calculation step (S409) and the polygon generation step (S411, S413, S415). Accordingly, since unnecessary processing can be eliminated, the polygons can be generated efficiently.

A twelfth aspect of the computer readable storage medium (11e) having stored thereon an image processing program (40) is based on the first aspect of the computer readable storage medium (11e) having stored thereon an image processing program (40). In the twelfth aspect, the image processing program (40) further causes the computer (10, 11b) to execute: a reference point setting step, an outer-circumference point setting step, a second distance reading step, a second coordinate point calculation step, a normal vector calculation step, and an average calculation step (S211, S213). The reference point setting step (S201) sets points on the virtual plane surface (PL), the points being interrelated to the distance information (41) and stored in the storage medium (11e, 12), as reference points with respect to which normal vector information (42) is generated. The outer-circumference point setting step (S203) sets, on the virtual plane surface (PL), two points which are distanced from each reference point by a predetermined unit distance in a predetermined first direction (an X-axis direction), and sets another two points which are distanced from each reference point by the unit distance in a second direction (a Z-axis direction) which is perpendicular to the first direction. The second distance reading step (S205) reads, from the storage medium (11e, 12), the distance information (41) on each reference point set in the reference point setting step (S201) and on the four points set in the outer-circumference point setting step (S203). The second coordinate point calculation step (S207) calculates coordinate points of positions which are respectively distanced from each reference point and the four points by distances indicated by the distance information (41) read in the second distance reading step (S205) in a direction perpendicular to the virtual plane surface (PL). The normal vector calculation step (S209) calculates normal vectors V1 to V4 of four triangle polygons, which each includes as vertices thereof, a point N0 corresponding to each reference point, a point corresponding to either of the two points N3 and N4 which are distanced from each reference point in the first direction (the X-axis direction), and a point corresponding to either of the two points N1 and N2 which are distanced from each reference point in the second direction (the Z-axis direction), among the five coordinate points (N0 to N4) calculated in the second coordinate point calculation step. The average calculation step (S211, S213) calculates an average value of the four normal vectors V1 to V4 calculated in the normal vector calculation step (S209), and interrelates the average value to information (an X-axis coordinate and a Z-axis coordinate) indicative of the position of each reference point on the virtual plane surface (PL) so as to be stored in the storage medium (11e, 12). The polygon generation step (S411, S413, S415) includes a normal vector setting step (S413) of reading a normal vector from the storage medium (11e, 12) and set the normal vector to each of the polygon vertices. Accordingly, even in the case where the number of divisions of the respective regions are changed due to a movement of the virtual camera (VP) or the like, a change in the normal vector of a polygon vertex can be minimized, and thus an image which never brings a sense of discomfort can be displayed.

A thirteenth aspect of the computer readable storage medium (11e) having stored thereon an image processing program (40) is based on the first aspect of the computer readable storage medium (11e) having stored thereon an image processing program (40). In the thirteenth aspect, the image processing program further causes the computer (10, 11b) to execute a normal vector reading step (S413) of reading, from the storage medium (11e, 12), normal vector information (42) indicative of a tilt of the curved surface (SF) at each of the coordinate points calculated in the first coordinate point calculation step (S409). The polygon generation step (S411, S413, S415) includes a normal vector setting step (S413) of setting the normal vector information (42) read in the normal vector reading step (S413) as the normal vector information (42) of each of the polygon vertices corresponding to each of the coordinate points. Accordingly, since processing for generating the normal vector information (42) is not necessary, an image which never brings a sense of discomfort can be displayed, efficiently.

A fourteenth aspect of the computer readable storage medium (11e) having stored thereon an image processing program (40) is based on the thirteenth aspect of the computer readable storage medium (11e) having stored thereon an image processing program (40). In the fourteenth aspect, in the storage means (11e, 12), the normal vector information (42) is stored as image information such that positions and colors composing the image correspond to respective positions and normal vectors on the curved surface (SF), respectively. Accordingly, Since the normal vector information (42) can be stored efficiently, a capacity required for storing the normal vector information (42) can be reduced. In addition, the normal vector information (42) can be read efficiently.

A fifteenth aspect of the computer readable storage medium (11e) having stored thereon an image processing program (40) is based on the first aspect of the computer readable storage medium (11e) having stored thereon an image processing program (40). In the fifteenth aspect, in the storage means (11e, 12), the distance information (41) is stored as image information such that positions and colors composing the image correspond to respective positions on the curved surface (SF) and distances from the virtual plane surface (PL), respectively (FIG. 16B). Accordingly, since the distance information (41) can be stored efficiently, the capacity required for storing the distance information (41) can be reduced. In addition, the distance information (41) can be read efficiently.

A sixteenth aspect of the computer readable storage medium (11e) having stored thereon an image processing program (40) is based on the first aspect of the computer readable storage medium (11e) having stored thereon an image processing program (40). In the sixteenth aspect, the curved surface (SF) is a landform arranged in the virtual three-dimensional space. Accordingly, the polygons representing the landform can be generated appropriately.

The present invention is also directed to an image processing apparatus for an image of a curved surface (e.g., the landform) as viewed from a virtual camera (VP) situated in a virtual three-dimensional space, an undulation of the curved surface (SF) being defined by a distance from a virtual plane surface (PL) arranged in the virtual three-dimensional space. The image processing apparatus comprises: plane surface division means (10, 11b) for dividing the virtual plane surface (PL) into a plurality of polygonal shape regions such that the closer a region is to the virtual camera (VP), the smaller areas the region is divided into; first distance reading means (10, 11b) for reading, from storage means (11e, 12), distance information (41) indicative of the distance from the virtual plane surface (PL), with respect to respective vertices of the plurality of polygonal shape regions; first coordinate point calculation means (10, 11b) for calculating coordinate points of positions which are respectively distanced from each of the vertices composing the polygons corresponding to the plurality of polygonal shape regions by distances indicated by the distance information (41) read by the first distance reading means (10, 11b) in a direction perpendicular to the virtual plane surface (PL); polygon generation means (10, 11b) for generating polygons by using the coordinate points calculated by the first coordinate point calculation means (10, 11b) as polygon vertices defining each of the polygons, the number of the polygons being substantially constant in each of the plurality of the polygonal shape regions; and drawing means (10, 11b) for drawing an image of the polygons which are generated in the polygon generation step (10, 11b), the image as being viewed from the virtual camera (VP).

According to the storage medium (11e) having stored thereon the image processing program (40) and the image processing apparatus (3) according to the present invention, when the image of the curved surface (SF) is to be generated, the undulation of the curved surface being defined by the distance from the virtual plane surface arranged in the virtual three-dimensional space, the closer the distance to the virtual camera (VP) is, the smaller areas the region is divided into. Further, substantially a common number of polygons are generated in each of the regions. Accordingly, it is possible to generate polygon information (44) which is capable of securing the quality of the image of the curved surface (SF) as viewed from the virtual camera (VP), and also capable of representing the curved surface (SF) which requires a small (i.e., appropriate) storage capacity.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a perspective view of the controller in a state where an upper housing thereof is removed;

FIG. 14A is a diagram showing an exemplary relation of a curved surface represented by a polygon model with the distance-containing image and the virtual plane surface;

FIG. 14B is a diagram showing an exemplary relation of a curved surface represented by a polygon model with the distance-containing image and the virtual plane surface;

DESCRIPTION OF THE PREFERRED EMBODIMENTS (Overall Configuration of Game System)

Figure 1:
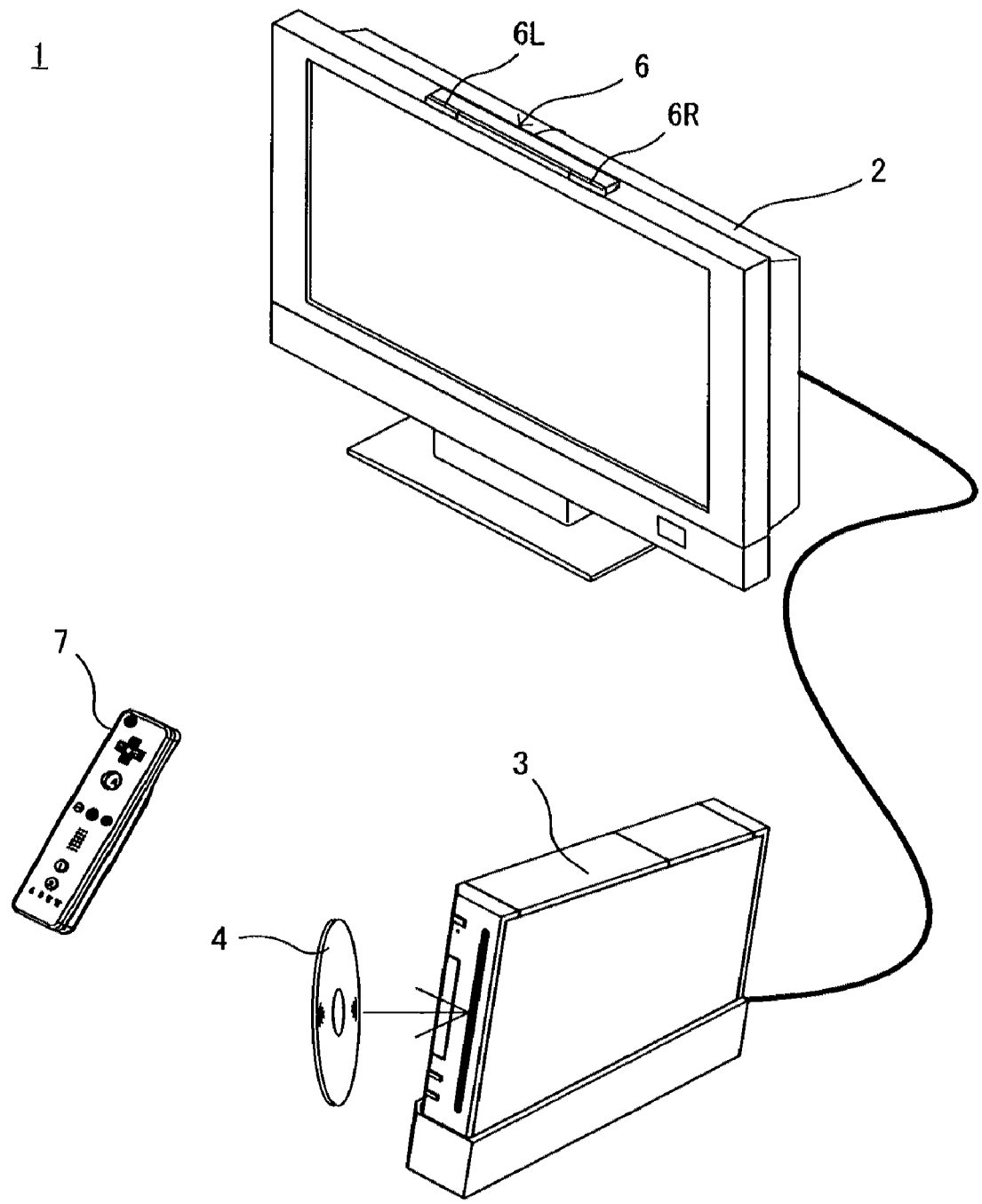
FIG. 1 is an external view illustrating a game system according to one embodiment of the present invention.

With reference to FIG. 1, a game system 1 including a game apparatus according to one embodiment of the present invention will be described. FIG. 1 is an external view of the game system 1. Hereinafter, a stationary game apparatus will be descried as an example of the game apparatus and a game program of the present embodiment. As shown in FIG. 1, the game system 1 includes a television receiver (hereinafter simply referred to as a "television") 2, a game apparatus 3, an optical disc 4, a marker section 6, and a controller 7. In the present system, a game process is executed on the game apparatus 3 in accordance with a game operation using the controller 7.

To the game apparatus 3 (which corresponds to an image processing apparatus), the optical disc 4 is detachably inserted. The optical disc 4 is an exemplary information storage medium exchangeably used for the game apparatus 3. A game program to be executed on the game apparatus 3 is stored on the optical disc 4. On a front surface of the game apparatus 3, an insertion slot for receiving the optical disc 4 is provided. When the optical disc 4 is inserted into the insertion slot, the game apparatus 3 reads and executes the game program stored on the optical disc 4 thereby executing the game process.

To the game apparatus 3, the television 2, which is an exemplary display device, is connected via a connection cord. A game image, which is obtained as a result of the game process executed on the game apparatus 3, is displayed on the television 2. On the periphery of a screen of the television 2 (at a portion above the screen shown in FIG. 1), the marker section 6 is located. The marker section 6 has two markers 6R and 6L at both ends thereof. The marker 6R (as well as 6L) is configured with one or more infrared LEDs, and outputs an infrared radiation forward from the television 2. The marker section 6 is connected to the game apparatus 3, and the game apparatus 3 is capable of controlling lighting of each of the infrared LEDs provided to the marker section 6.

The controller 7 is an input device for providing the game apparatus 3 with operation data indicative of an operation performed with respect to the controller 7. The controller 7 and the game apparatus 3 are connected to each other via wireless communication. In the present embodiment, the wireless communication between the controller 7 and the game apparatus 3 is performed by using a technique of Bluetooth (registered trademark), for example. In another embodiment, the controller 7 and the game apparatus 3 may be connected to each other via a cable.

(Internal Configuration of Game Apparatus 3)

Figure 2:
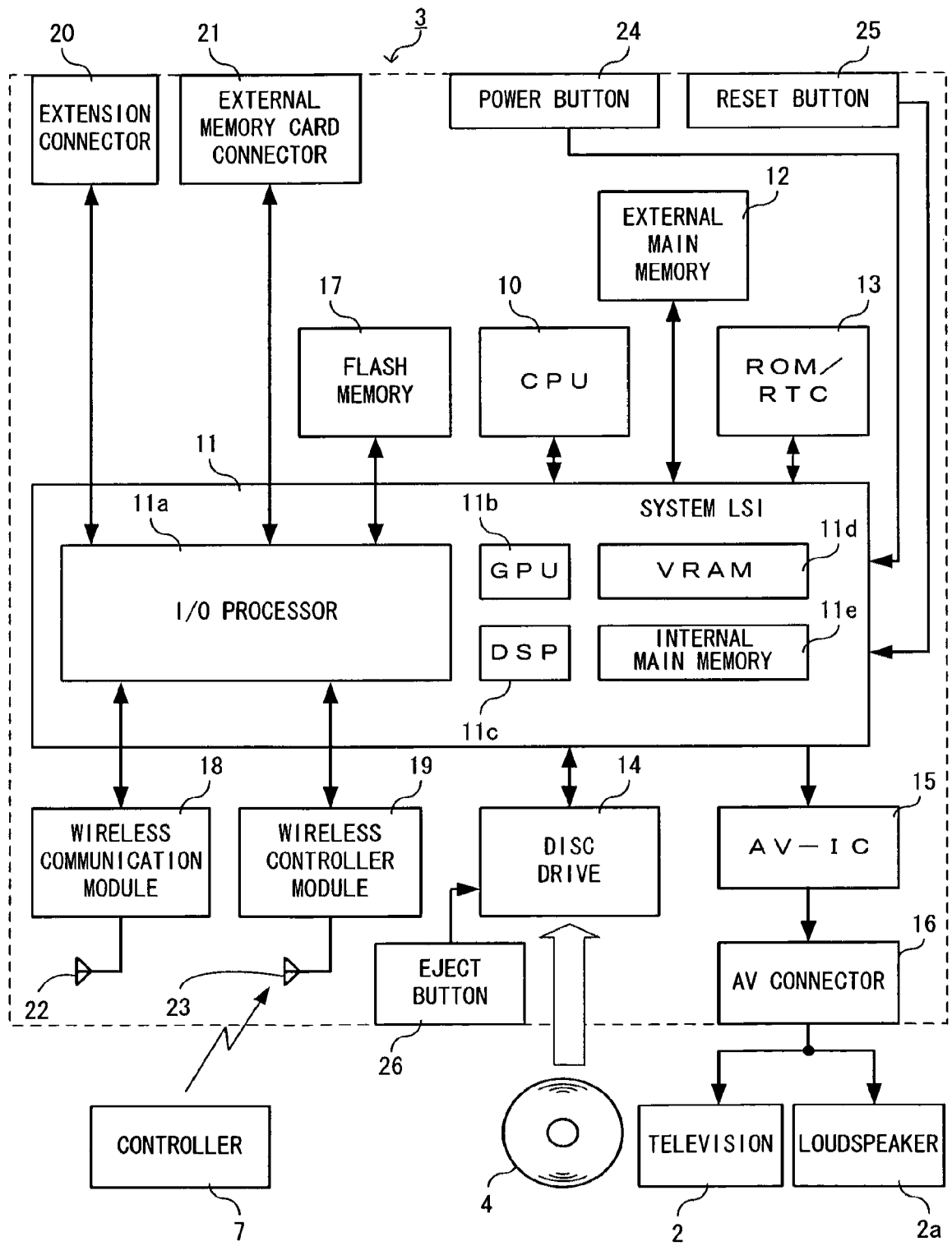
FIG. 2 is a block diagram showing a configuration of a game apparatus.

With reference to FIG. 2, an internal configuration of the game apparatus 3 will be described. FIG. 2 is a block diagram showing a configuration of the game apparatus 3. The game apparatus 3 includes a CPU 10, a system LSI 11, an external main memory 12, a ROM/RTC 13, a disc drive 14, an AV-IC 15 and the like.

The CPU 10 executes the game program stored on the optical disc 4, thereby executing the game process. That is, the CPU 10 functions as a game processor. The CPU 10 is connected to the system LSI 11. In addition to the CPU 10, the external main memory 12, the ROM/RTC 13, the disc drive 14, and the AV-IC 15 are connected to the system LSI 11. The system LSI 11 performs processing such as control of data transmission among respective component parts connected thereto, generation of an image to be displayed, and acquisition of data from an external apparatus. An internal configuration of the system LSI will be described later. The external main memory 12, which is of a volatile type, stores therein programs such as the game program read from the optical disc 4, the game program read from a flash memory 17, and various data. The external main memory 12 is used as a work area and a buffer space for the CPU 10. The ROM/RTC 13 includes a ROM (so-called a boot ROM) incorporating a program for starting up the game apparatus 3, and a clock circuit (RTC: Real Time Clock) for counting time. The disc drive 14 reads program data, texture data and the like from the optical disc 4, and writes the read data into an internal main memory 11e described later or the external main memory 12.

Further, provided to the system LSI 11 are an input/output (I/O) processor 11a, a GPU (Graphics Processor Unit) 11b, a DSP (Digital Signal Processor) 11c, a VRAM 11d, and the internal main memory 11e. Although not shown in diagrams, these component parts 11a to 11e are connected to one another via an internal bus.

The GPU 11b forms a part of drawing means and generates an image in accordance with a graphics command (draw command) from the CPU 10. The VRAM 11d stores therein data (such as polygon data and texture data) necessary for the GPU 11b to execute the graphics command. When an image is to be generated, the GPU 11b uses data stored in the VRAM 11d and generates the image data.

The DSP 11c functions as an audio processor, and generates audio data by using sound data and sound waveform (tone quality) data stored in the internal main memory 11e and the external main memory 12.

The image data and the audio data generated as above described are read by the AV-IC 15. The AV-IC 15 outputs the read image data to the television 2 via the AV connector 16, and also outputs the read audio data to the loudspeakers 2a embedded in the television 2. Accordingly, the image is displayed on the television 2 and the sound is outputted from the loudspeakers 2a.

I/O processor 11a executes transmission of data among component pats connected thereto, and also executes download of data from an external apparatus. The I/O processor 11a is connected to the flash memory 17, the wireless communication module 18, the wireless controller module 19, an extension connector 20, and a memory card connector 21. An antenna 22 is connected to the wireless communication module 18, and an antenna 23 is connected to the wireless controller module 19.

The I/O processor 11a is connected to a network via the wireless communication module 18 and the antenna 22, and is capable of communicating with another game apparatus and various serves connected to the network. The I/O processor 11a accesses the flash memory 17 at regular intervals so as to detect data, if any, which is necessary to be transmitted to the network. If the data is detected, the detected data is transmitted to the network via the wireless communication module 18 and the antenna 22. Further, the I/O processor 11a receives data transmitted from another game apparatus and data downloaded from a download server via the network, the antenna 22 and the wireless communication module 18, and stores the received data in the flash memory 17. The CPU 10 executes the game program, and reads the data stored in the flash memory 17 so as to be used on the game program. In the flash memory 17, not only data transmitted between the game apparatus 3 and another game apparatus or various servers, but also save data of a game (result data or midstream data of a game) played by using the game apparatus 3 may be stored.

The I/O processor 11a receives operation data transmitted from the controller 7 via the antenna 23 and the wireless controller module 19, and (temporarily) stores the operation data in the internal main memory 11e or in the buffer space of the external main memory 12.

The extension connector 20 and the memory card connector 21 are connected to the I/O processor 11a. The extension connector 20 is an interface connector as typified by a USB and an SCSI, and is capable of performing communication with the network, instead of the wireless communication module 18, by connecting thereto a medium such as an external storage medium, a peripheral device such as another controller, or a wired communication connector. The memory card connector 21 is a connector for connecting thereto the external storage medium such as a memory card. For example, the I/O processor 11a accesses the external storage medium via the extension connector 20 and the memory card connector 21, and then saves data or reads data.

To the game apparatus 3, a power button 24, a reset button and an eject button are provided. The power button 24 and the reset button 25 are connected to the system LSI 11. When the power button 24 is turned on, power is supplied to each of the component parts of the game apparatus 3 via an AC adaptor, which is not shown. When the reset button 25 is pressed, the system LSI 11 reactivates the start-up program of the game apparatus 3. The eject button 26 is connected to the disc drive 14. When the eject button 26 is pressed, the optical disc 4 is ejected from the disc drive 14.

Figure 3:
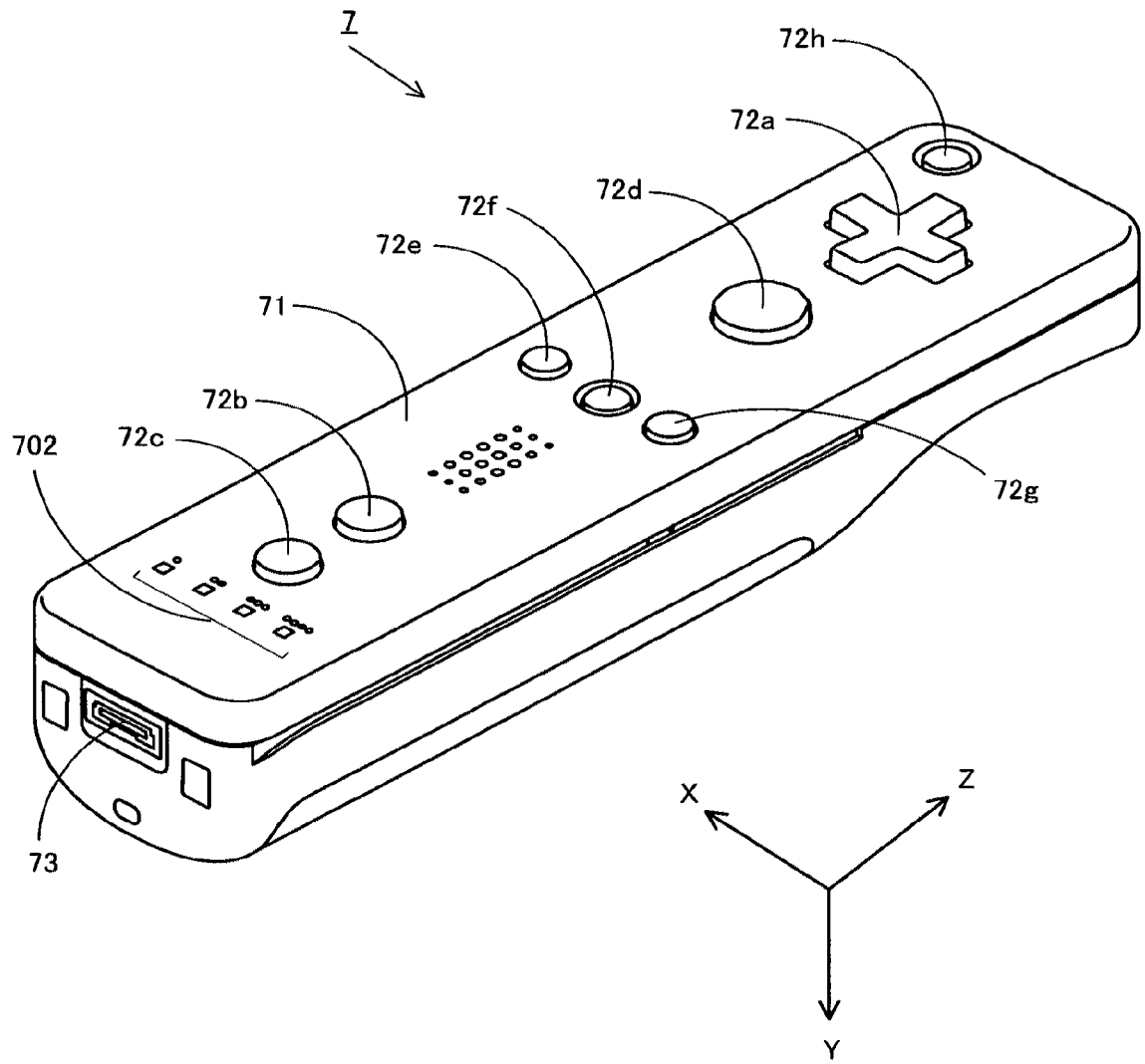
FIG. 3 is a perspective view of a controller 7 as viewed from a top rear side thereof.
Figure 4:
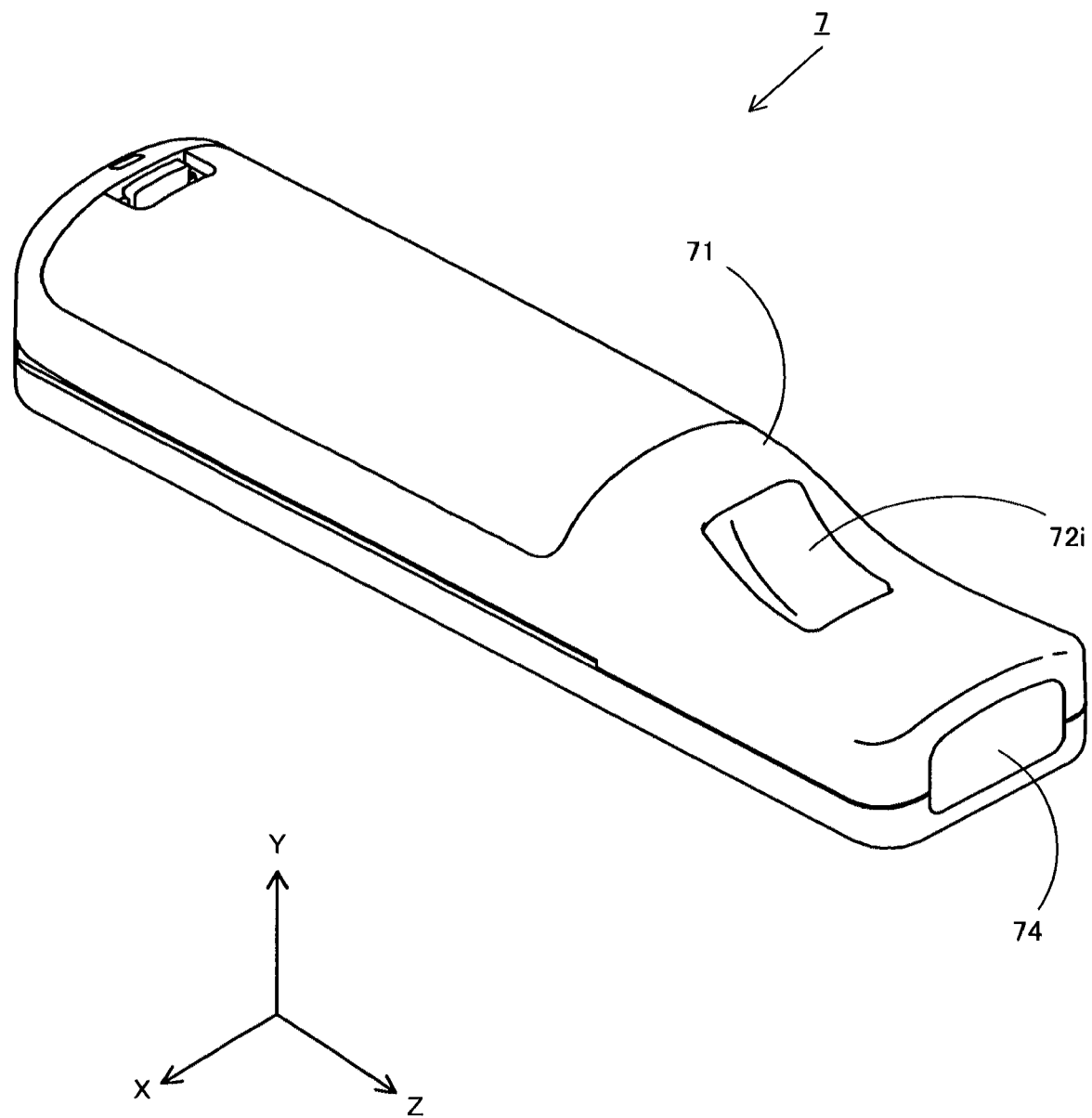
FIG. 4 a perspective view of the controller 7 as viewed from a bottom front side thereof.

With reference to FIGS. 3 and 4, the controller 7 will be described. FIG. 3 is a perspective view of the controller 7 as viewed from a top rear side thereof. FIG. 4 is a perspective view of the controller 7 as viewed from a bottom front side thereof.

As shown in FIGS. 3 and 4, the controller 7 includes a housing 71, which is formed by, for example, plastic molding, and a plurality of operation sections is provide on the housing 71. The housing 71 has a substantially parallelepiped shape extending in a longitudinal direction from front to rear, and an overall size thereof is small enough to be held by one hand of an adult or even a child.

At a front center portion of a top surface of the housing 71, a cross key 72a is provided. The cross key 72a is a cross-shaped four direction push switch, and the operation portions thereof are respectively located on cross-shaped projecting portions arranged at intervals of 90 degrees such that the operation portions correspond to four directions (front, rear, right and left). A player selects one of the front, rear, left and right directions by pressing one of the operation portions of the cross key 72a. Through an operation of the cross key 72a, the player can, for example, indicate a direction in which a player character or the like appearing in a virtual game world is to move, or select an instruction from a plurality of choices.

The cross key 72a is an operation section for outputting an operation signal in accordance with the direction input operation performed by the player. The operation section may be provided in another form. For example, the operation section may be provided such that four push switches are arranged in the cross directions and an operation signal is outputted by the player's pressing one of the four push switches. Further, in addition to the four push switches, a center switch may be provided at a crossing position of the above-described cross directions so as to provide an operation section composed of the four push switches and the center switch. Alternatively, the cross key 72a may be replaced with an operation section which includes an inclinable stick (so-called a joystick) projecting from the top surface of the housing and which outputs the operation signal in accordance with an inclining direction of the stick. Still alternatively, the cross key 72a may be replaced with an operation section which includes a disc-shaped member horizontally slidable and which outputs an operation signal in accordance with a sliding direction of the disc-shaped member. Still alternatively, the cross key 72a may be replaced with a touchpad.

Behind the cross key 72a on the top surface of the housing 71, a plurality of operation buttons 72b, 72c, 72d, 72e, 72f and 72g is provided. The operation buttons 72b, 72c, 72d, 72e, 72f and 72g are each an operation section for outputting an operation signal assigned thereto when the player presses a head thereof. For example, functions such as a No. 1 button, a No. 2 button and A button and the like are assigned to the operation buttons 72b, 72c and 72d. Further, functions such as a minus button, a home button, a plus button and the like are assigned to the operation buttons 72e, 72f and 72g. Various operation functions are assigned to these operation buttons 72a, 72b, 72c, 72d, 72e, 72f and 72g in accordance with the game program executed by the game apparatus 3. In an exemplary arrangement shown in FIG. 3, the operation buttons 72b, 72c and 72d are arranged in a line at the center in a front-rear direction on the top surface of the housing 71. Further, the operation buttons 72e, 72f, and 72g are arranged in a line on the top surface of the housing 71 in a left-right direction between the operation buttons 72 band 72d. The operation button 72f has a top surface thereof buried in the top surface of the housing 71 so as not to inadvertently pressed by the player.

In front of the cross key 72a on the top surface of the housing 71, an operation button 72h is provided. The operation button 72h is a power switch for turning on and off the power to the game apparatus 3 by remote control. The operation button 72h also has a top surface thereof buried in the top surface of the housing 71, so as not to be inadvertently pressed by the user.

Behind the operation button 72c on the top surface of the housing 71, a plurality of LEDs 702 is provided. A controller type (number) is assigned to the controller 7 such that the controller 7 is distinguishable from another controller 7. The LEDs 702 are used for, for example, informing the player of the controller type set for the controller 7. Specifically, when data is transmitted from the controller 7 to the wireless communication module 18, a LED corresponding to the controller type is turned on among the plurality of LEDs 702.

On the top surface of the housing 71, sound holes for emitting a sound from a loudspeaker (the loudspeaker 706 shown in FIG. 5), which is described later, are formed between the operation button 72b and the operation buttons 72e, 72f and 72g.

On a button surface of the housing 71, a recessed portion is formed. The recessed portion on the bottom surface of the housing 71 is formed in a position in which an index finger or middle finger of the player is located when the player holds the controller 7 with one hand and points a front portion thereof to the markers 6L and 6R. On a slope surface of the recessed portion, an operation button 72i is provided. The operation button 72i is an operation section acting as, for example, a B button.

On a front surface of the housing 71, an image pickup element 743 constituting a part of an imaging information calculation section 74 is provided. The imaging information calculation section 74 is a system which analyzes image data picked up by the controller 7, identifies an area having high brightness in the image, and detects a position of a gravity center, a size and the like of the area. The imaging information calculation section 74 has, for example, a maximum sampling period of about 200 frames/sec., and thus can trace and analyze even a relatively fast motion of the controller 7. A configuration of the imaging information calculation section 74 will be described later in detail. On a rear surface of the housing 71, a connector 73 is provided. The connector 73 is, for example, an edge connector, and is used for coupling and connecting the controller with a connection cable.

For the same of specific explanation, a coordinate system set with respect to the controller 7 will be defined. As shown in FIGS. 3 and 4, an X-axis, a Y-axis, and Z-axis which are perpendicular to one another are defined with respect to the controller 7. Specifically, the longitudinal direction of the housing 71 corresponding to the front-rear direction of the controller 7 is defined as a Z-axis direction, and a direction toward the front surface (a surface on which the imaging information calculation section 74 is mounted) of the controller 7 is a Z-axis positive direction. The up-down direction of the controller 7 is defined as a Y-axis direction, and a direction toward the bottom surface (a surface on which the operation button 72i is provided) of the housing 71 is defined as a Y-axis positive direction. The left-right direction of the controller 7 is defined as an X-axis direction, and a direction toward the left side surface (a side surface which is not shown in FIG. 3) of the housing 71 is defined as an X-axis positive direction.

Figure 6:
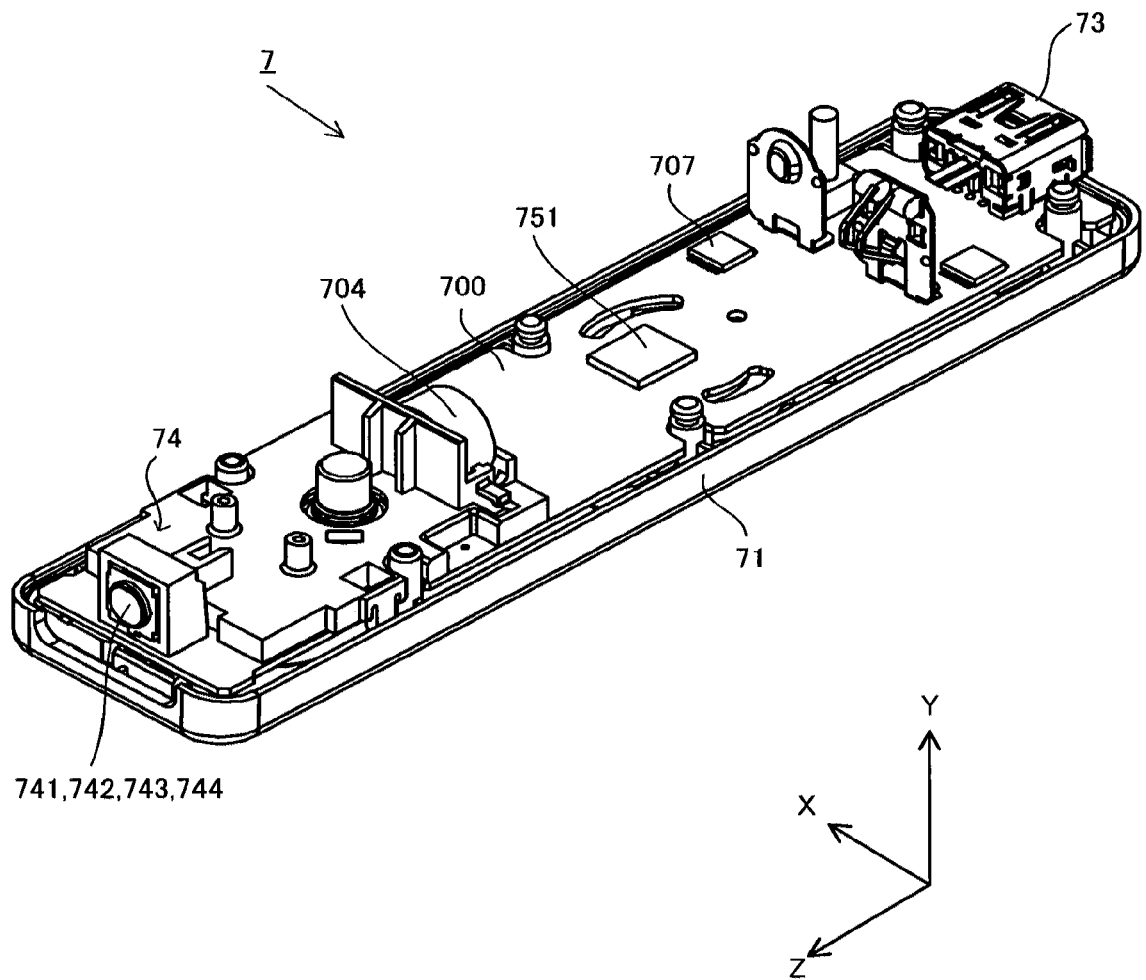
FIG. 6 is a perspective view of the controller in a state where a lower housing thereof is removed.

With reference to FIGS. 5 and 6, an internal configuration of the controller 7 will be described. FIG. 5 is a perspective view of the controller 7 in a state where an upper housing (a part of the housing 71) thereof is removed. FIG. 6 is a perspective view of the controller 7 in a state where a lower housing (a part of the housing 71) thereof is removed. FIG. 6 is a perspective view as viewed from a reverse side of a substrate 700 shown in FIG. 5.

As shown in FIG. 5, the substrate 700 is fixed inside the housing 71. Provided on a top main surface of the substrate 700 are the operation buttons 72a, 72b, 72c, 72d, 72e, 72f, 72g and 72h, an acceleration sensor 701, the LEDs 702, an antenna 754 and the like. These component parts are connected to a microcomputer 751 and the like (see FIGS. 6 and 7) by lines (not shown) formed on the substrate 700 and the like. The wireless module 753 (see FIG. 7) and the antenna 754 allow the controller 7 to act as a wireless controller. A quartz oscillator, which is not shown, is provided in an inside of the housing 71, and generates a reference clock of the microcomputer 751 described later. On the top main surface of the substrate 700, the loudspeaker 706 and an amplifier 708 are provided. The acceleration sensor 701 is provided at the left side of the operation button 72d on the substrate 700 (that is, at a peripheral portion, instead of a center portion, on the substrate 700). Accordingly, the acceleration sensor 701 can detect, in accordance with a rotation centering on the longitudinal direction of the controller 7, acceleration caused by a centrifugal force element as well as directional variation in gravitational acceleration. Therefore, based on a predetermined calculation, the game apparatus 3 and the like can detect, from the detected acceleration data, the rotation of the controller 7 highly sensitively.

As shown in FIG. 6, at a front edge of a bottom main surface of the substrate 700, the imaging information calculation section 74 is provided. The imaging information calculation section 74 includes an infrared filter 741, a lens 742, the image pick up element 743, and an image processing circuit 744, which are located in this order from the front side of the controller 7, and provided on the bottom main surface of the substrate 700. At a rear edge of the bottom main surface of the substrate 700, the connector 73 is attached. Further, on the bottom main surface of the substrate 700, a sound IC 707 and the microcomputer 751 are provided. The sound IC 707 is connected to the microcomputer 751 and the amplifier 708 by lines formed on the substrate 700 or the like, and outputs an audio signal to the loudspeaker 706 via the amplifier 708 in accordance with the audio data transmitted from the game apparatus 3.

On the bottom main surface of the substrate 700, a vibrator 704 is attached. The vibrator 704 may be, for example, a vibration motor or a solenoid. The vibrator 704 is connected to the microcomputer 751 via the lines formed on the substrate 700 or the like, and an operation thereof is turned on/off in accordance with vibration data transmitted from the game apparatus 3. The controller 7 is vibrated when the vibrator 704 is turned on, and vibration is conveyed to the player holding the controller 7. Thus, so-called a vibration-feedback game is realized. The vibrator 704 is locate data relatively front side of the housing 71, and thus the housing 71 vibrates to a large extent while the player is holding the housing 71, whereby the player feels vibration sensitively.

Figure 7:
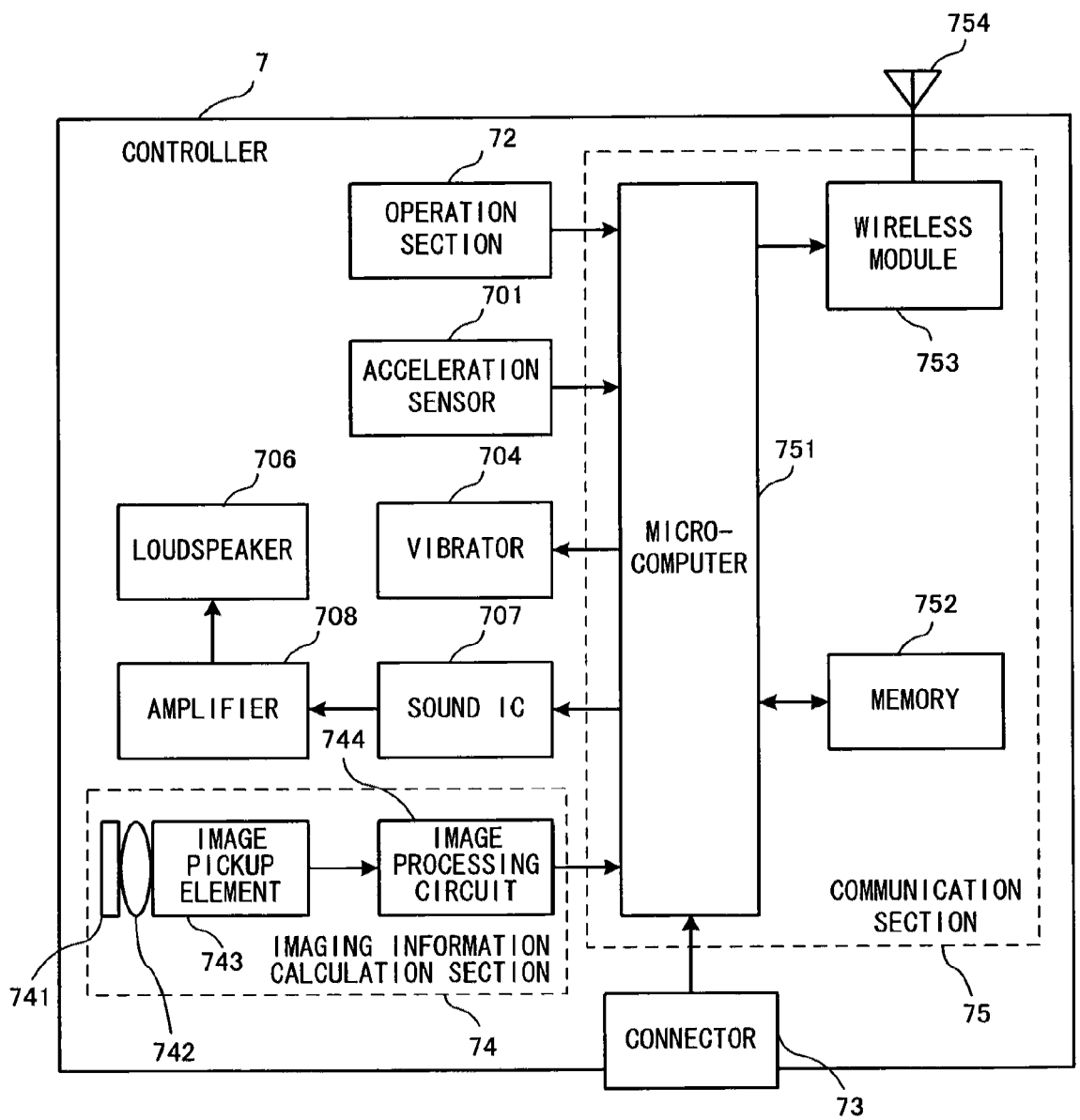
FIG. 7 is a block diagram showing a configuration of the controller.

With reference to FIG. 7, an internal configuration of the controller 7 will be described. FIG. 7 is a block diagram showing a configuration of the controller 7.

As shown in FIG. 7, the controller 7 includes thereinside a communication section 75, in addition to the above-described operation section 72, the imaging information calculation section 74, the acceleration sensor 701, the vibrator 704, the loudspeaker 706, the sound IC 707, and the amplifier 708.

The imaging information calculation section 74 includes the infrared filter 741, the lens 742, the image pickup element 743 and the image processing circuit 744. The infrared filter 741 allows only an infrared radiation to pass therethrough, the infrared radiation being included in the light which is incident on the front side of the controller 7. The lens 742 converges the infrared radiation which has passed through the infrared filter 741, and outputs the infrared radiation to the image pickup element 743. The image pickup element 743 is a solid-state image pickup element such as a CMOS sensor or a CCD, and picks up an image of the infrared radiation converged by the lens 742. In other words, the image pickup element 743 picks up the image of only the infrared radiation having passed through the infrared filter 741, and generates image data. The image data generated by the image pickup element 743 is processed by the image processing circuit 744. Specifically, the image processing circuit 744 processes the image data obtained from the image pickup element 743 and detects a high brightness point thereof, and outputs, to the communication section 75, an process result data indicative of a result of the detection of the position coordinate and an area of the high brightness point. The imaging information calculation section 74 is fixed on the housing 71 of the controller 7, and an imaging direction of the housing 71 can be changed by changing an orientation of the housing 71.

Preferably, the controller 7 includes triaxial (X-axis, Y-axis, and Z-axis) acceleration sensor 701. The triaxial acceleration sensor 701 detects linear acceleration in three directions, i.e., an up-down direction (the Y-axis shown in FIG. 3), a left-right direction (the X-axis direction shown in FIG. 3) and a front-rear direction (the Z-axis direction shown in FIG. 3).

The communication section 75 includes the microcomputer 751, a memory 752, the wireless module 753 and the antenna 754. The microcomputer 751 controls the wireless module 753 for wirelessly transmitting the transmission data by using the memory 752 as a storage area at the time of processing. Further, the microcomputer 751 controls operations of the sound IC 707 and the vibrator 704 in accordance with the data received by the wireless module 753 from the game apparatus 3 via the antenna 754. The sound IC 707 processes the sound data and the like transmitted from the game apparatus 3 via the communication section 75. Further, the microcomputer 751 actuates the vibrator 704 in accordance with the vibration data (e.g., a signal for turning the vibrator 704 ON or OFF) or the like which is transmitted from the game apparatus 3 via the communication section 75.

Data from the controller 7 such as an operation signal (key data) from the operation section 72, acceleration signals (acceleration data in X, Y, and Z-axes directions) in three axes directions from the acceleration sensor 701, and the process result data from the imaging information calculation section 74 are outputted to the microcomputer 751. The microcomputer 751 temporarily stores the inputted data (the key data, the acceleration data in the X, Y, and Z-axes directions, and the process result data) in the memory 752 as the transmission data to be transmitted to the wireless communication module 18. The wireless transmission from the communication section 75 to the wireless communication module 18 is performed at predetermined time intervals. Since the game process is generally performed at an interval of 1/60 sec., the wireless transmission needs to be performed at the interval of a shorter time period. Specifically, the game process is performed at the interval of 16.7 ms (1/60 sec.), and the transmission interval of the communication section 75, which is configured with the Bluetooth (registered trademark), is 5 ms. At a timing of performing a transmission to the wireless communication module 18, the microcomputer 751 outputs the transmission data stored in the memory 752 to the wireless module 753 as a series of pieces of operation information. Based on the Bluetooth (registered trademark) technology, for example, the wireless module 753 emits, from the antenna 754, a radio signal indicative of the operation information by using a carrier wave having a predetermined frequency. Thus, the key data from the operation section 72, the acceleration data in the X, Y, and Z-axes directions from the acceleration sensor 701, and the process result data from the imaging information calculation section 74 are transmitted from the controller 7. The radio signal is received by the wireless communication module 18 of the game apparatus 3, and the radio signal is then demodulated or decoded in the game apparatus 3, whereby the series of pieces of operation information (the key data, the acceleration data in the X, Y, and Z-axes directions, and the process result data) are obtained.

The CPU 10 of the game apparatus 3 performs the game process in accordance with the obtained operation information and in accordance with the game program. In the case where the communication section 75 is configured with the Bluetooth (registered trademark) technology, the communication section 75 may have a function of receiving transmission data which is wirelessly transmitted from other devices.

The above-described hardware configuration is merely an example, and the present invention is applicable to any computer system. For example, the present invention is applicable to a computer system in which the game apparatus 3 is replaced by a personal computer.

Next, an outline of the image processing performed by the game apparatus 3 will be described. As a feature of the present invention, an image of a curved surface (a landform in the present embodiment) as viewed from a virtual camera situated in the virtual three-dimensional space is drawn, an undulation of the curved surface being defined by a distance from a virtual plane surface arranged in a virtual three-dimensional space. A type of the curved surface drawable by using the present invention is not limited to the landform. For example, the curved surface may be one side surface (e.g., a top side surface) of an object (such as a building) arranged in the virtual three-dimensional space.

Further, in the present embodiment, a polygon model indicative of the landform is generated, and an image is drawn on the television 2 shown in FIG. 1 based on the generated polygon model. The polygon model undergoes texture mapping, and a texture image indicative of a pattern of the ground surface, for example, is mapped onto the polygon model as necessary. In the following description, description of the texture mapping processing will be omitted for convenience.

With reference to FIGS. 8 to 12, plane surface division processing (i.e., processing executed in a "plane surface division step", and processing executed by "plane surface division means") will be described. In the plane surface division processing, the virtual plane surface arranged in the virtual three-dimensional space is divided, in accordance with a distance from the virtual camera situated in the virtual three-dimensional space, into a plurality of regions each composed of a polygonal shape having three or more predetermined number of vertices. FIG. 8A and FIG. 8B are schematic diagrams showing exemplary processing (i.e., the processing executed in a "first division step") of dividing a virtual plane surface PL into a first predetermined number (four in this case) of regions. FIG. 8A is a diagram showing the virtual plane surface before the division, whereas FIG. 8B is a diagram showing the virtual plane surface after the division.

Figure 8A:
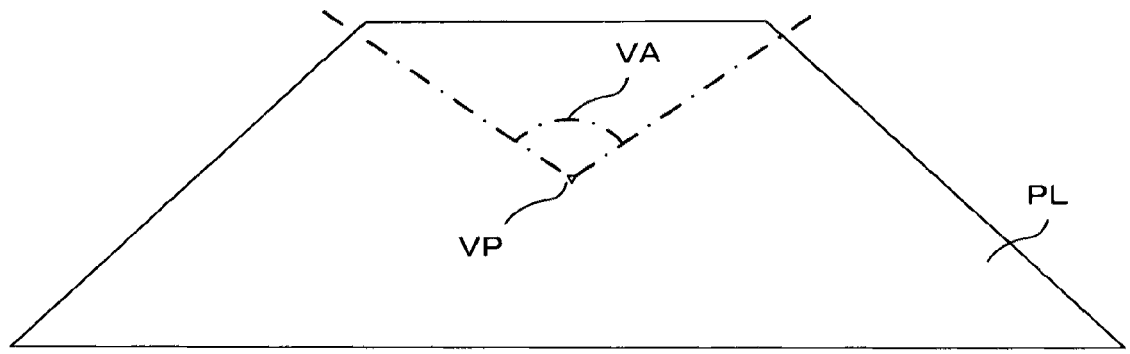
FIG. 8A is a diagram showing the virtual plane surface before the division.
Figure 8A:
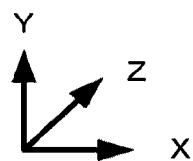

As shown in FIG. 8A, in the virtual three-dimensional space, the X-axis, the Y-axis, and the Z-axis are defined so as to represent a left-right direction, an up-down direction, and a front-rear direction of the diagram, respectively. A quadrangular (a square, in this case) virtual plane surface PL is situated on a X-Z plane surface. In the present embodiment, an undulation of the landform SF to be drawn on the television 2 (see FIG. 14A) is defined by a distance (i.e., a distance corresponding to a Y coordinate) thereof from the virtual plane surface PL shown in FIG. 8. Further, a position and an orientation of the virtual camera VP are set in accordance with an instruction from the controller 7 shown in FIG. 1, and in this case, the virtual camera VP is situated above a substantially central portion of the virtual plane surface PL (in the Y-axis positive direction) while facing the Z-axis positive direction.

Figure 8B:
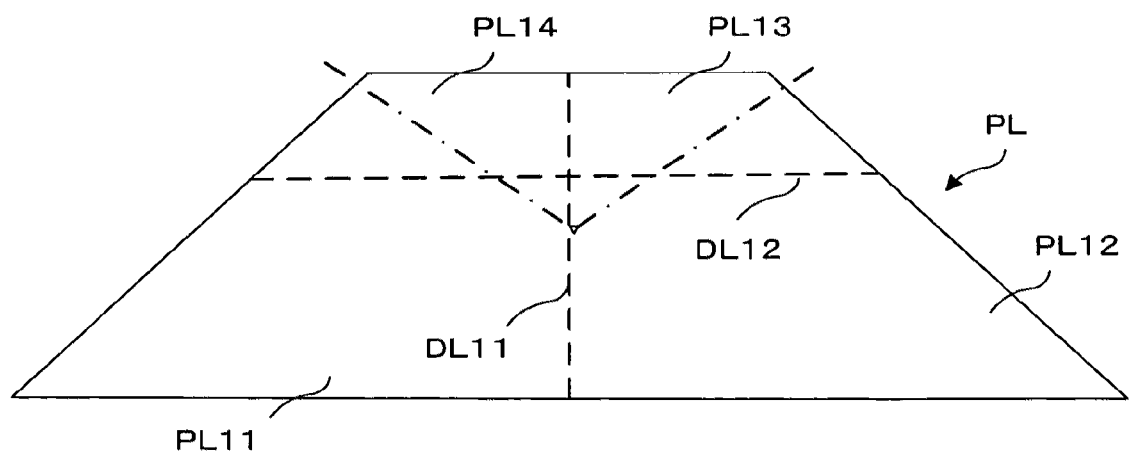
FIG. 8B is a diagram showing the virtual plane surface after the division.

Further, a viewing angle VA (i.e., an angle indicative of a range virtually taken by the virtual camera VP) of predetermined degrees (e.g., 110°) is set to the virtual camera VP. As shown in FIG. 8B, the virtual plane surface PL is equally divided, by two straight lines DL11 and DL12 which are each formed by connecting middle points between facing two sides of the virtual plane surface PL, into a first predetermined number (four in this case) of regions PL11 to PL14.

In the present embodiment, a case where the virtual plane surface PL is a square region is described. However, a region having another shape (such as a rectangle, a circle and the like) may be applicable. Further, in the present embodiment, a case where the virtual plane surface PL is divided into four regions PL11 to PL14 is described. However, the virtual place surface PL may be divided into two or more first predetermined number (e.g., 16 or the like) of regions, instead of four. If the greater the first predetermined number is, the less the number of times the region is divided.

Figure 9A:
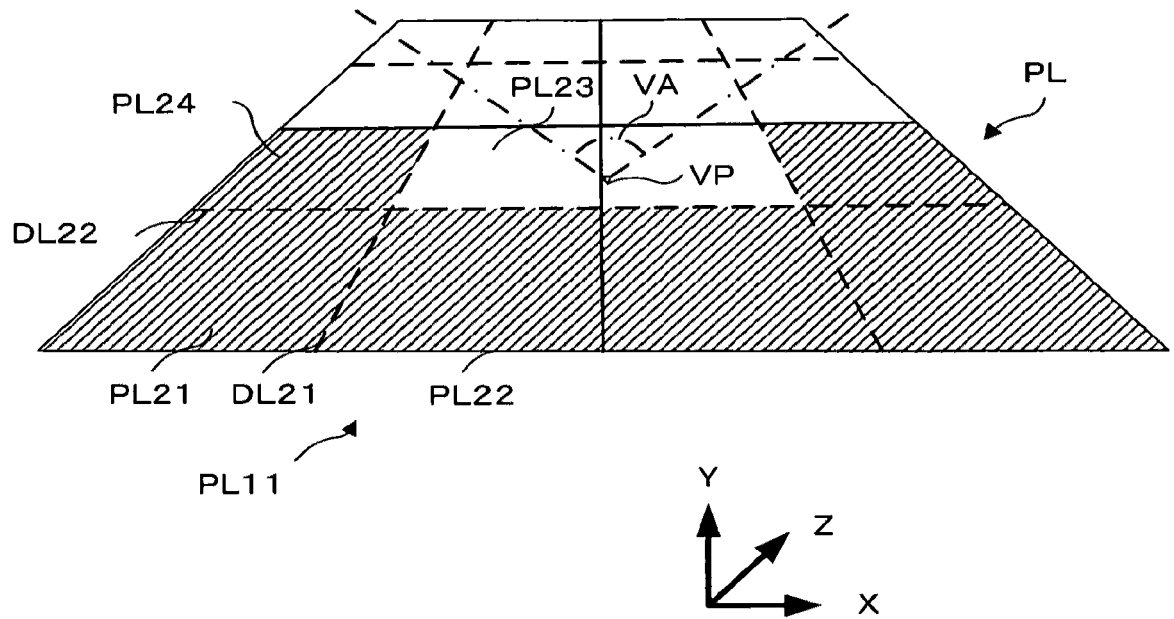
FIG. 9A is a explanatory diagram showing exemplary processing of excluding a region outside a field of view of a virtual camera from processing target regions.
Figure 9B:
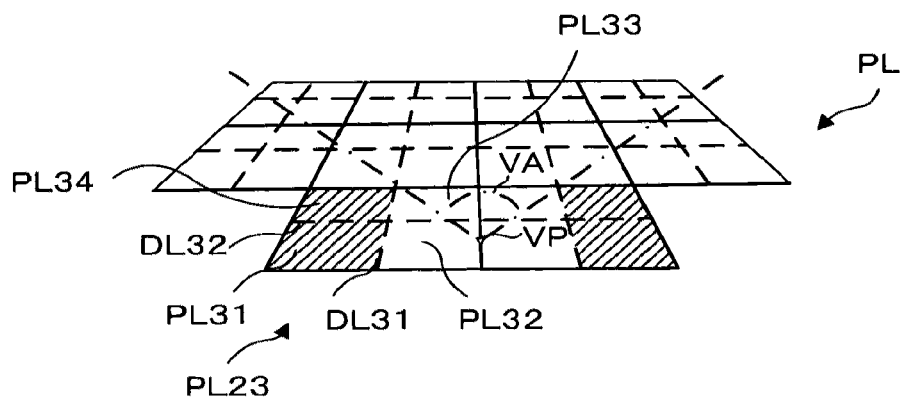
FIG. 9B is a explanatory diagram showing exemplary processing of excluding a region outside a field of view of a virtual camera from processing target regions.

FIG. 9A and FIG. 9B are schematic diagrams showing exemplary processing (so-called clipping processing) of excluding a region, which is outside a field of view of the virtual camera VP, from the processing target regions (i.e. processing executed in a "field of view determination step" and in a "region exclusion step"). The regions PL11 to PL14 shown in FIG. 8B are each divided into the first predetermined number of regions (four in the present embodiment) as shown in FIG. 9A (i.e., a total of 16 regions are generated). For example, the region PL11 is equally divided into four regions PL21 to PL24 by two straight lines DL21 and DL22, which are each formed by connecting middle points between two facing sides of the region PL11. Among the four regions PL21 to PL24, three regions PL21, PL22 and PL24, which are each hatched, fall outside the field of view of the virtual camera VP (hereinafter referred to as out-of-view regions), and consequently, processing is performed so as to exclude the three regions from the target regions to be processed thereafter.

Among 16 regions shown in FIG. 9A, regions (i.e., 10 regions) excluding 6 out-of-view regions including the regions PL21, PL22 and PL24 are equally divided into the first predetermined number of regions (four in the present embodiment), respectively, as shown in FIG. 9B (i.e., a total of 40 regions are generated). For example, the region PL23 shown in FIG. 9A is equally divided into four regions PL31 to PL34 by two straight lines DL31 and DL32 which are each formed by connecting middle points between two facing sides of the region PL23. Among the generated four regions PL31 to PL34, two of the regions PL31 and PL34, which are each hatched, fall outside the field of view of the virtual camera VP, and thus processing is performed so as to exclude the regions PL31 and PL34 from the target regions to be processed thereafter. In this manner, the respective regions are each equally divided into four regions by two straight lines which are each formed by connecting middle points between two facing sides of the region, and thus the virtual plane surface PL can be divided efficiently with simple processing. Further, the out-of-view regions are excluded from the target regions to be processed thereafter, and thus a processing load can be reduced.

In the present embodiment, a case is described where each of the regions is equally divided into four regions in sequence. However, instead of four, each of the regions may be divided into the first predetermined number (e.g. 16 and the like) of regions. The greater the first predetermined number is, the less number of times each of the regions is divided (i.e., processing time can be reduced). On the other hand, if the first predetermined number is less, it is possible to generate a polygon model which is capable of creating an image having a uniform image quality.

Figure 10A:
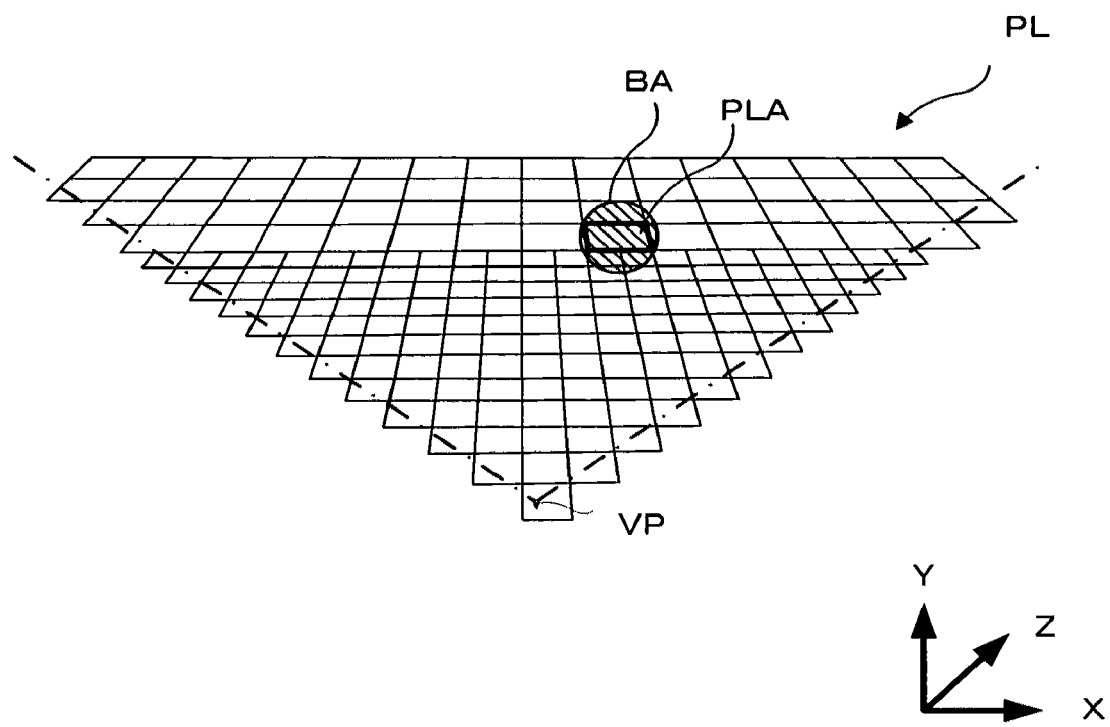
FIG. 10A is a explanatory diagram showing exemplary processing of calculating a size evaluation value used for determining whether or not regions needs to be divided into.
Figure 10B:
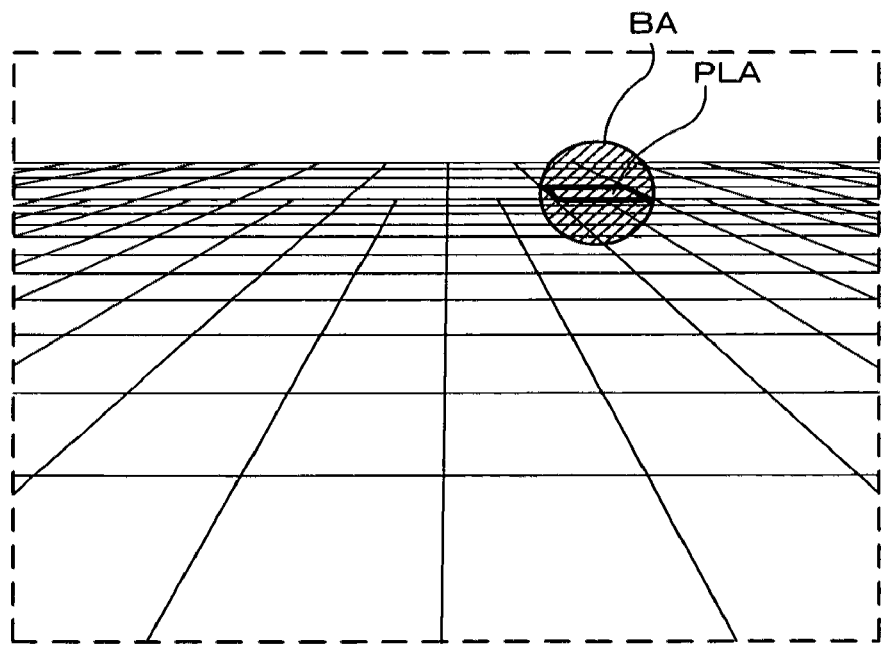
FIG. 10B is a explanatory diagram showing exemplary processing of calculating a size evaluation value used for determining whether or not regions needs to be divided into.

FIG. 10A and FIG. 10B are schematic diagrams showing exemplary processing (i.e., processing executed in a "size evaluation value calculation step") of calculating a size evaluation value used for determining whether or not the region needs to be divided or not. In the plane surface division processing, the closer the distance to the virtual camera VP is, the smaller areas the region needs to be divided into. Specifically, the size evaluation value indicative of a size of an image of each region as viewed from the virtual camera VP is calculated, and each region is divided such that the calculated size evaluation value thereof is equal to or lower than a predetermined threshold value.

As shown in FIG. 10A, when the virtual plane surface PL is divided, the size evaluation value of a region PLA is calculated as follows. A sphere BA, whose great circle is a circle circumscribing a square corresponding to the region PLA, is virtually generated. An area of an image (FIG. 10B) of the generated sphere BA, as viewed from the virtual camera VP, is calculated as the size evaluation value of the region PLA (the area corresponding to the number of pixels on a screen of the television 2 shown in FIG. 1).

The present embodiment exemplifies the case where the size evaluation value corresponds to the area of the image of the sphere as viewed from the virtual camera VP, the sphere having the great circle circumscribing the square corresponding to one of the divided regions. However, the size evaluation value may correspond to an area of a sphere as viewed from the virtual camera VP, the sphere having the great circle inscribing the square corresponding to the region. Further, the size evaluation value may be any value as long as the size evaluation value corresponds to the size of the image of the divided region as viewed from the virtual camera VP. For example, the size evaluation value may be the distance between the divided region and the virtual camera VP.

Figure 11A:
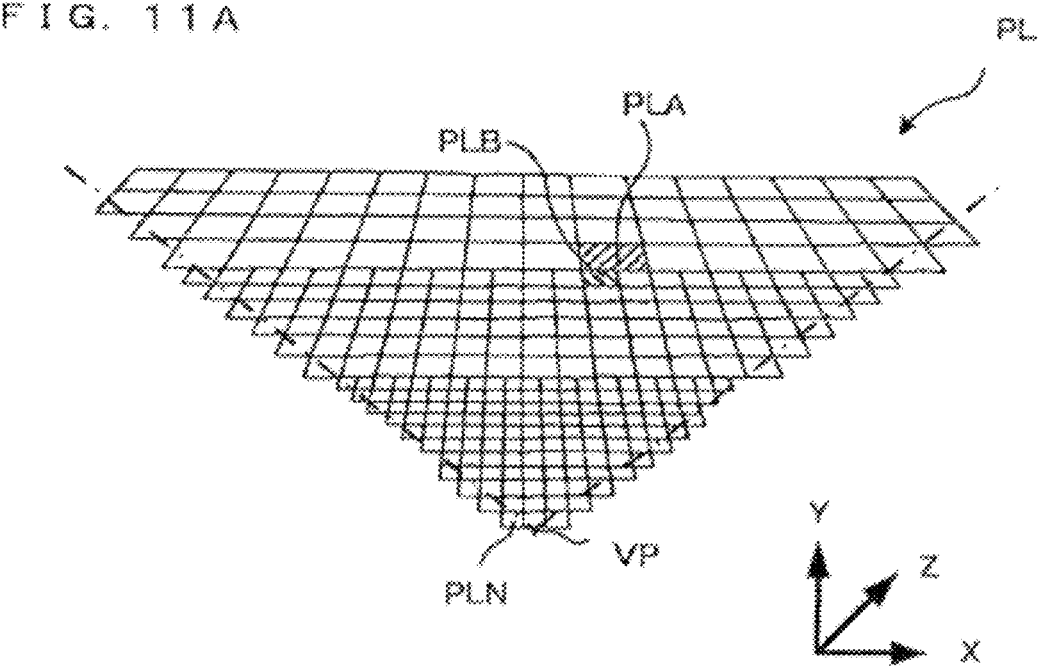
FIG. 11A is a schematic diagram showing exemplary re-division processing and exemplary triangle generation processing.
Figure 11B:
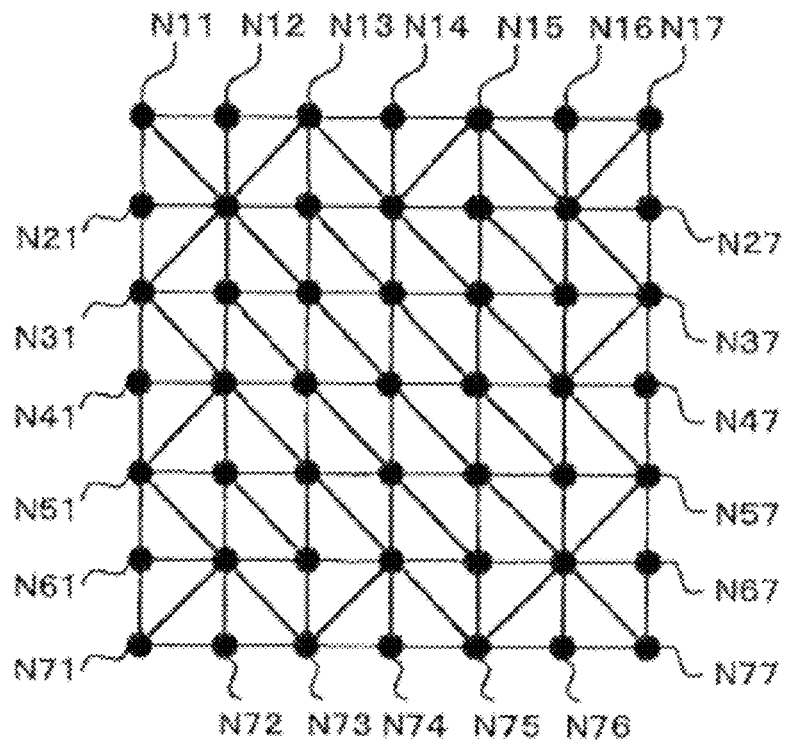
FIG. 11B is a schematic diagram showing exemplary re-division processing and exemplary triangle generation processing.

FIG. 11A and FIG. 11B are a schematic diagrams showing exemplary re-division processing (i.e., processing executed in a "re-division step") and exemplary triangle generation processing (i.e., processing executed in a "triangle generation step"). In the plane surface division processing, division is repeatedly performed until the size evaluation values of all the regions become equal to or lower than the predetermined threshold values, and then the re-division processing is executed. In the re-division processing, each of the generated regions is further divided into small regions which are composed of a second predetermined number (36 in the present embodiment) of square regions. FIG. 11A is a diagram showing a result of divisions which are repeatedly performed until the size evaluation values of all the regions become equal to or lower than the predetermined threshold values. As shown in the diagram, through the plane surface division processing, a region PLN, which is close to the virtual camera VP, is (finely) divided into relatively small regions, whereas regions PLA and PLB, which are distanced from the virtual camera VP are (roughly) divided into relatively large regions. In the re-division processing, each of the regions including the regions PLN, PLA and PLB, shown in FIG. 11A, are equally divided into 6 small regions in two directions along two adjacent sides of each of the regions, respectively, thereby generating, equally, 36 small regions (see FIG. 11B), which are each of a square shape.

In this manner, through the re-division processing, it is possible to efficiently generate polygons having appropriate sizes so as to represent the curved surface SF. That is, in the plane surface division processing, the virtual plane surface PL is divided into regions having appropriate sizes in accordance with the size evaluation value, and in the re-division processing, each of the regions is equally divided into the second predetermined number (36 in the present embodiment) of small regions, whereby the polygons having appropriate sizes can be generated efficiently.

Figure 12:
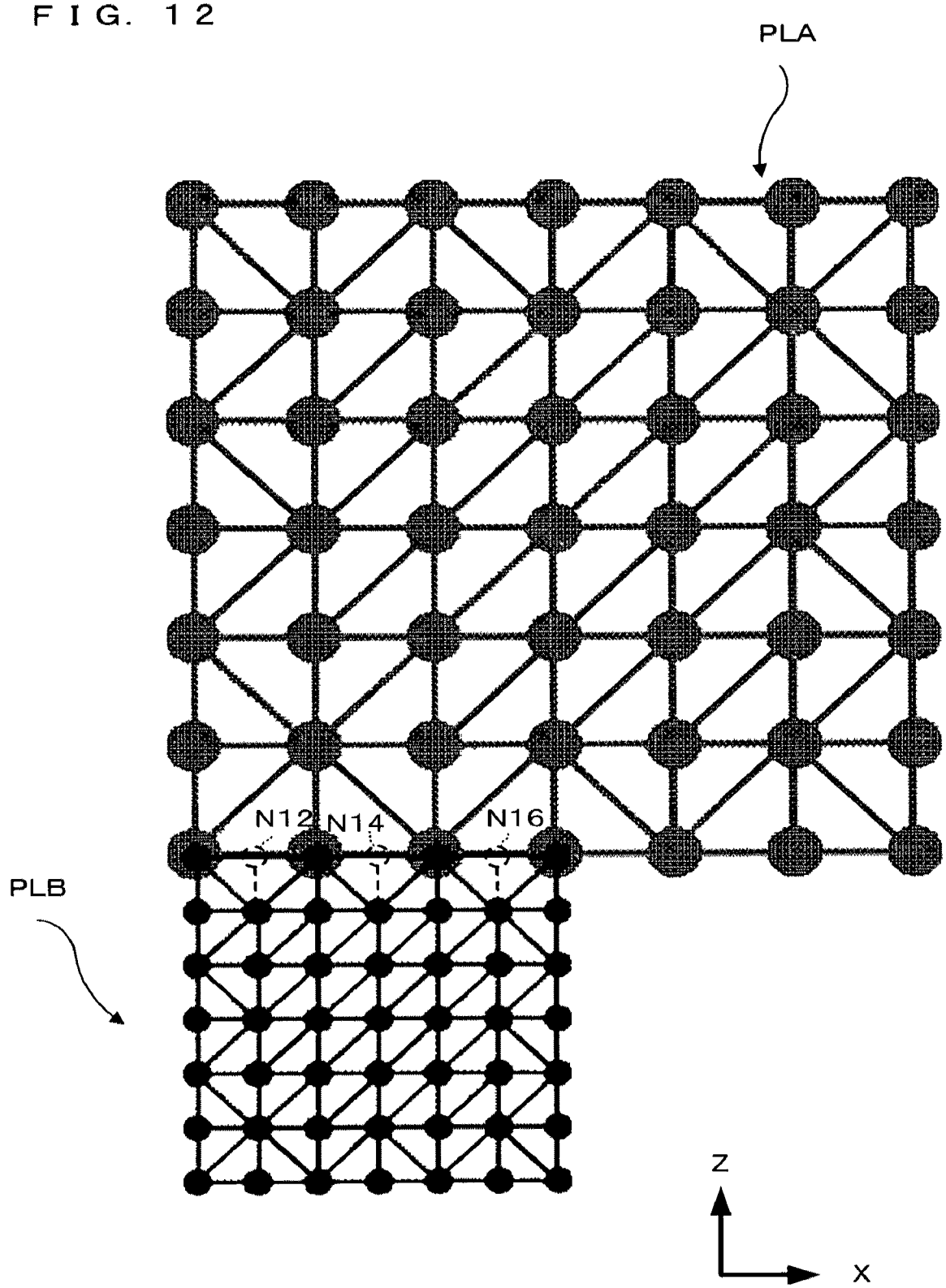
FIG. 12 is a diagram showing an exemplary polygon connection state in which regions of different sizes are adjoining to each other.

The present embodiment is exemplified by the case where, in the re-division processing, each of the regions is divided into 36 small regions. However, each of the regions may be divided into an even number (e.g., 4, 8 and the like) of small regions, respectively, in the two directions along adjacent sides of each of the regions. In the case where each of the regions is divided into an odd number of small regions, respectively, in the two directions along adjacent side of each of the regions, polygons cannot be connected to each other smoothly as shown in FIG. 12.

In the triangle generation processing, each of the small regions, which is of a quadrangular shape (square in this case) and is generated in the re-division step, is divided diagonally into two triangles, and two triangle polygons corresponding to the two triangles are generated. As with the regions PLA and PLB shown in FIG. 11A, when regions having different sizes are adjacent to each other, the regions need to be divided into the triangle regions respectively, in the triangle generation processing, such that polygons corresponding thereto can be connected to one another smoothly.

Specifically, as shown in FIG. 11B, in the triangle generation processing, extracted are outer-circumference small regions (i.e., small regions each including at least one of vertices N11 to N17, N21 to N71, N72 to N77, and N27 to N67) which are each of a square shape and includes, as at least one side thereof, a part of a side composing one of the square regions generated in the plane surface division processing (i.e., an "outer-circumference extraction step" is executed). Among the extracted outer-circumference small regions, in the case of the outer-circumference small regions which each includes vertices (the vertices N11, N17, N71 and N77 in the present embodiment) composing the one of the square regions generated in the plane surface division processing, diagonal lines including the vertices (the vertices N11, N17, N71 and N77) are selected as diagonal lines for divining the squares composing the outer-circumference small regions. On the other hand, if the outer-circumference small regions does not include the vertices (the vertices N11, N17, N71 and N77) composing the square region generated in the plane surface division processing, diagonal lines are selected, as diagonal lines for dividing the squares composing the outer-circumference small regions, such that diagonal lines of adjoining outer-circumference small region are substantially perpendicular to one another (i.e., such that the diagonal lines forms a zigzag line) (a "diagonal line selection step" is executed).

In the present embodiment, a case is described where 72 triangle regions having a pattern shown in FIG. 11B are generated from all the regions generated in the plane surface division processing (see FIG. 11A). In this case, the above-described triangle generation step, which includes the "outer-circumference extraction step" and the "diagonal line selection step", does not need to be executed for all the regions, and thus the processing is simplified. In another embodiment, the triangle regions may be generated by executing the triangle generation step, which includes the "outer-circumference extraction step" and the "diagonal line selection step", for all the regions generated in the plane surface division processing.

FIG. 12 is a diagram showing an exemplary polygon connection state in the case where regions having different sizes are adjacent to one another. For example, as shown in FIG. 11B, in the case where the triangle generation processing is performed with respect to each of the regions PLA and PLB shown in FIG. 11A, processing is performed so as to remove vertices N12, N14 and N16 of the region PLB as shown in FIG. 12, whereby polygons are connected to one another smoothly with simple processing.

The present embodiment exemplifies the case where each of the small regions is divided into the triangle regions, as shown in FIG. 11B, in the triangle generation processing. However, the small regions other than the outer-circumference small regions may be divided into any manner. In FIG. 11B, the small regions other than the outer-circumference small regions are each divided by a diagonal line of a negative slope. However, the small regions may be each divided by a diagonal line of a positive slope.

In FIG. 11, the case is described where, from each of the regions generated in the plane surface division processing, the outer-circumference small regions are extracted and then the diagonal line selection processing is performed. In the present embodiment, the case is described where each of the regions generated in the plane surface division processing is divided into 72 triangle regions as shown in FIG. 11B, whereby the triangle generation processing is executed. That is, in the present embodiment, each of the regions generated in the plane surface division processing is divided into predetermined 72 triangle regions (see FIG. 11B). In this manner, the predetermined triangle regions are generated, and thus the processing is simplified.

Next, with reference to FIGS. 13 and 14, the first distance reading processing, first coordinate point calculation processing, and polygon generation processing will be described. First, with reference to FIG. 13, the first distance reading processing will be described. In the first distance reading processing (i.e., processing executed in a "first distance reading step", and processing executed by "first distance reading means"), distance information indicative of distances from the virtual plane surface PL is read from the internal main memory 11*e* with respect to vertices (the vertices N11 to N77 and the like shown in FIG. 11B)) of respective polygonal shapes (the triangles shown in FIG. 11B, in this case) of the regions generated in the plane surface division processing.

Figure 13A:
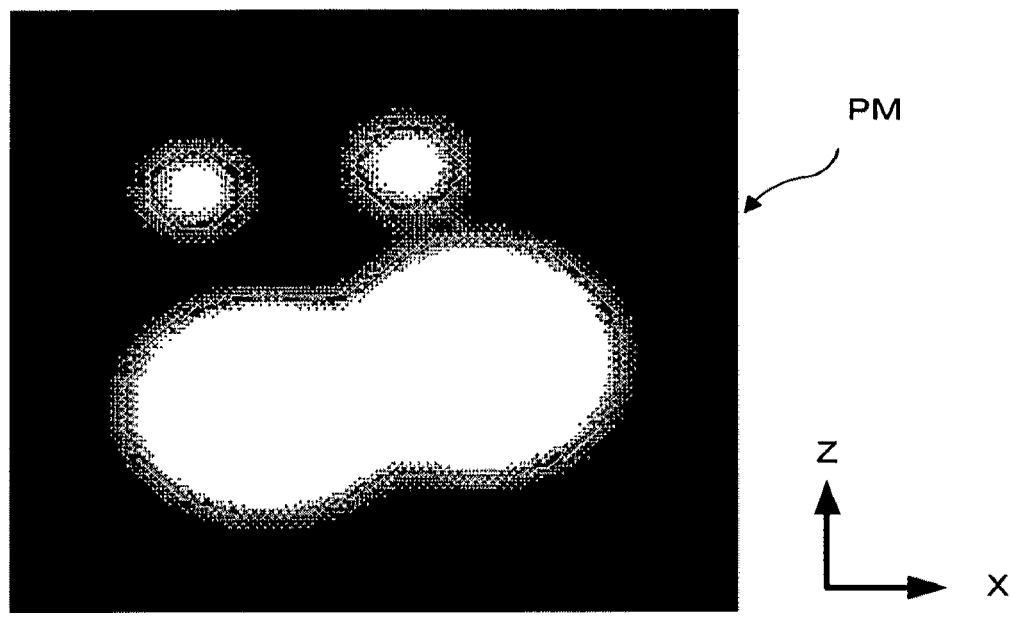
FIG. 13A is a diagram showing an exemplary interrelation between a distance-containing image and the virtual plane surface.
Figure 13B:
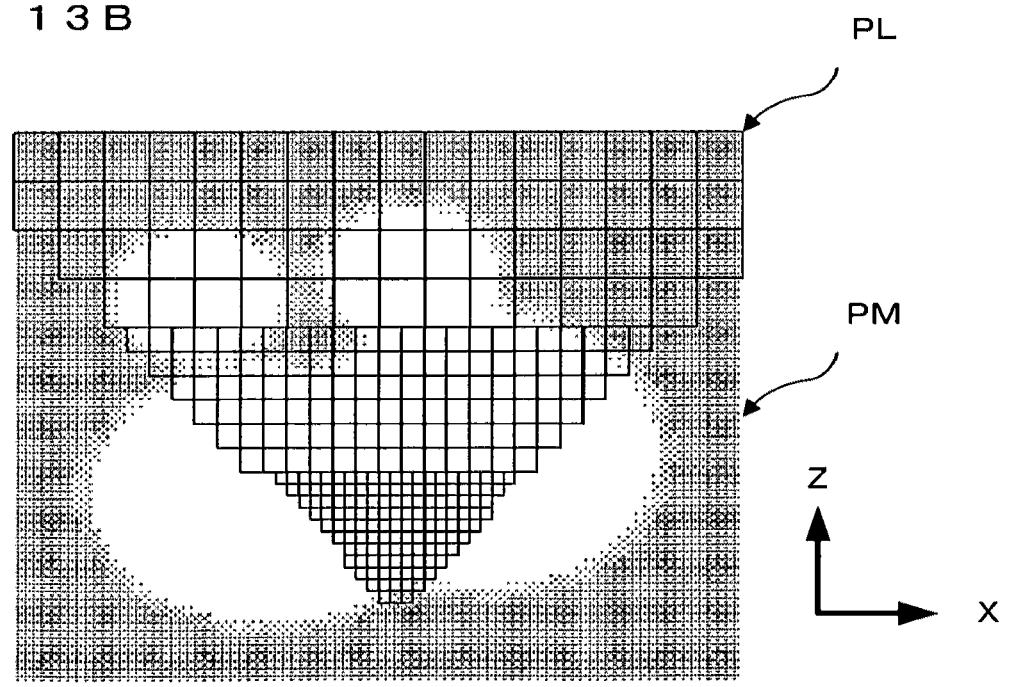
FIG. 13B is a diagram showing an exemplary interrelation between a distance-containing image and the virtual plane surface.

FIG. 13A and FIG. 13B are diagrams showing an exemplary correspondence between a distance-containing image PM and a virtual plane surface PL. FIG. 13A is an image showing an exemplary distance-containing image PM which is image information in which positions and colors of respective points composing the distance-containing image correspond, respectively, to positions of respective points on the curved surface SF and distances of the respective points from the virtual plane surface PL (see FIG. 14A). The positions of the respective points composing the distance-containing image PM shown in FIG. 13A correspond to the positions in the virtual plane surface PL shown in FIG. 8A, and the colors (contrasting represented by 8 bits (256-level gray scales) using an α value of the image information) of the respective points correspond to the distance information. In the present embodiment, the higher the curved surface SF is (i.e., the farther the distance from the virtual plane surface PL is), the whiter the image is. The landform SF represented by the distance-containing image PM shown in FIG. 13A has a gourd-shaped mountain approximately at a central portion of the virtual plane surface PL, and also has two small mountains at the rear side of the gourd-shaped mountain (see FIG. 14A).

FIG. 13B is a diagram showing an exemplary interrelation between the distance-containing image PM shown in FIG. 13A (in the diagram, the distance-containing image PM is displayed in a semi-transparent manner after being subject to semi-transparency processing) and the virtual plane surface PL (the regions shown in FIG. 11A). As shown in FIG. 13B, in the first distance reading processing, the vertices (the vertices N11 to N77 shown in FIG. 11B) composing the triangle regions (see FIG. 11B, the triangle regions not shown in FIG. 13 for convenience) are caused to correspond to the distance-containing image PM shown in FIG. 13A, whereby the distance information is read based on the α value of the distance-containing image PM, the triangle regions being generated in the re-division processing of the regions which are shown in FIG. 11A and which are generated by dividing the virtual plane surface PL in the plane surface division processing.

In the first distance reading processing, an x coordinate and a Z coordinate are calculated with respect to each of the vertices composing the triangle regions (not shown), which are generated byre-dividing the square regions (see FIG. 13B) which are generated by dividing the virtual plane surface PL. The α value of the distance-containing image PM (see FIG. 13B) corresponding to the calculated X coordinate and Z coordinate is read, and a distance corresponding to the read α value is calculated, whereby the distance information is obtained.

In this manner, the positions of the respective points, which compose the distance-containing image PM stored in the internal main memory 11e, correspond to the positions on the virtual plane surface PL, and the colors (contrasts represented by 8 bits (256-level gray scales) using the α value of the image information) of the respective points correspond to the distance information. Therefore, the distance information indicative of the curved surface SF can be stored efficiently. Consequently, a capacity required for storing the distance information 41 (see FIG. 17) can be reduced, and the distance information can be read efficiently.

In the present embodiment, a case where the distance information is stored as the α value of the image information is described. However, the distance information may be stored as another color information (e.g., any of RGB color information) corresponding to pixels composing the distance-containing image. Further, the distance information may be stored in a form other than the image information (e.g., in a form of matrix in which the distance information corresponds to vertex position information). Still further, in the present embodiment, the case where the distance-containing image PM is stored in the internal main memory 11e is described. However, the distance-containing image PM may be stored in another storage means (e.g., the flash memory 17 or the like).

Next, with reference to FIG. 14, the first coordinate point calculation processing and the polygon generation processing will be described. In the first coordinate point calculation processing (i.e., processing executed in a "first coordinate point calculation step" and processing executed by "first coordinate point calculation means"), each of the vertices (the vertices N11 to N77 and the like shown in FIG. 11B) composing the polygonal shapes (i.e., the triangles shown in FIG. 11B), which corresponds to the regions generated in the plane surface division processing, is moved in parallel to a position in a direction (i.e., the Y-axis direction) perpendicular to the virtual plane surface PL by a distance indicated by the distance information read in the first distance reading processing, and then a coordinate point of the position is calculated.

In the polygon generation processing (i.e., processing executed in a "polygon generation step" and processing executed by "polygon generation means"), the position corresponding to the coordinate point calculated in the first coordinate point calculation processing is used as a polygon vertex which defines a polygon, and polygons corresponding to the curved surface SF is generated.

FIG. 14A and FIG. 14B are diagrams showing an exemplary relation of the curved surface SF, which is represented by the polygon model, with the distance-containing image PM and the virtual plane surface PL. FIG. 14A is a general view, and FIG. 14B is an enlarged view of a circumference of one region PLC which is generated in the plane surface division processing. Although not shown in FIG. 14, each of the square regions (e.g., the region PLC) generated in the plane surface division processing is divided into 72 triangle regions (see FIG. 11B).

As shown in FIG. 14, in the first coordinate point calculation processing, each of the vertices composing the triangle regions generated in the plane surface division processing is moved in parallel to the position in the direction (the Y-axis direction) perpendicular to the virtual plane surface PL by the distance indicated by the distance information (the distance information corresponding to the α value of the distance-containing image PM) read in the first distance reading processing, which is described with reference to FIG. 13, and the coordinate point of the moved position is calculated. For example, a position (indicated with a white circle shown in FIG. 14B) of each of the vertices composing 72 triangle regions (not shown) included in the region PLC is moved in parallel in the Y-axis direction by a distance indicated by the distance information, and a coordinate point of the moved position (i.e., a coordinate point of each of the polygon vertices included in each of the 72 triangle polygons composing the polygon model of the curved surface SF) is calculated.

As shown in FIG. 14, in the polygon generation processing, the point (indicated by the white circle shown in FIG. 14B) corresponding to the coordinate point calculated in the first coordinate point calculation processing is used as each of the polygon vertices defining vertices of the polygons, and the polygons corresponding to the curved surface SF are generated. For example, 72 triangle polygons SFC are generated as polygons corresponding to the 72 triangle regions (not shown) in the region PLC.

In this manner, with respect to each of the regions generated in the plane surface division processing, the polygons corresponding to the 72 triangle regions are generated, and thus polygons having appropriate sizes are efficiently generated so as to represent the curved surface SF. In other words, in the plane surface division processing, the size of each of the regions is determined so as to define the size of each of the polygons, and in the polygon generation processing, 72 (i.e., the second predetermined number (36)×2 of) triangle polygons corresponding to the respective regions are generated. Accordingly, the polygons having the appropriate sizes are generated efficiently so as to represent the curved surface SF.

Figure 15A:
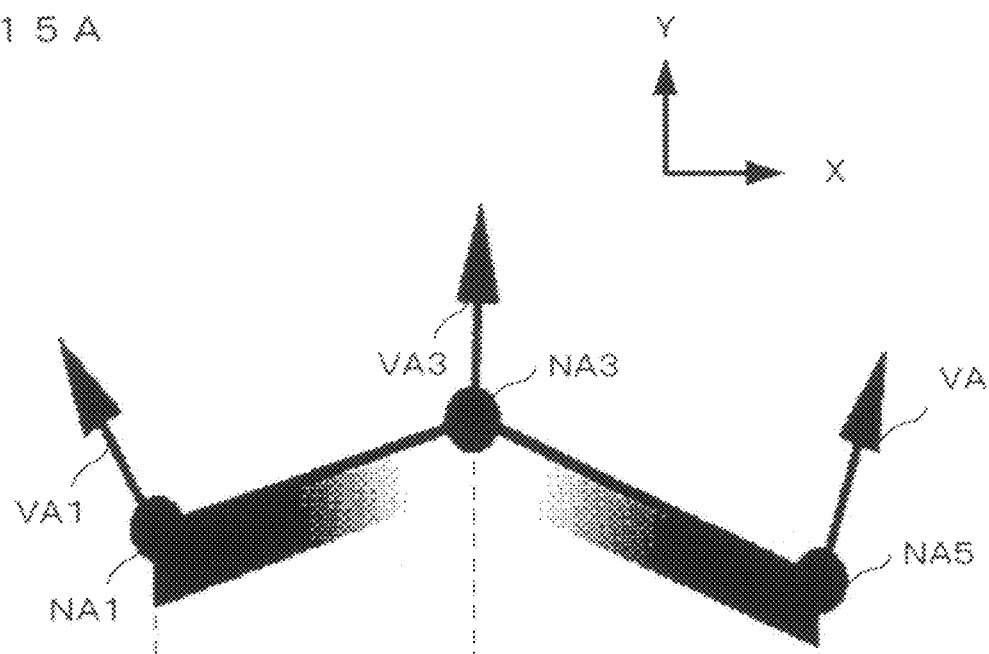
FIG. 15A is a diagram showing exemplary relations between normal vectors and polygons.
Figure 15B:
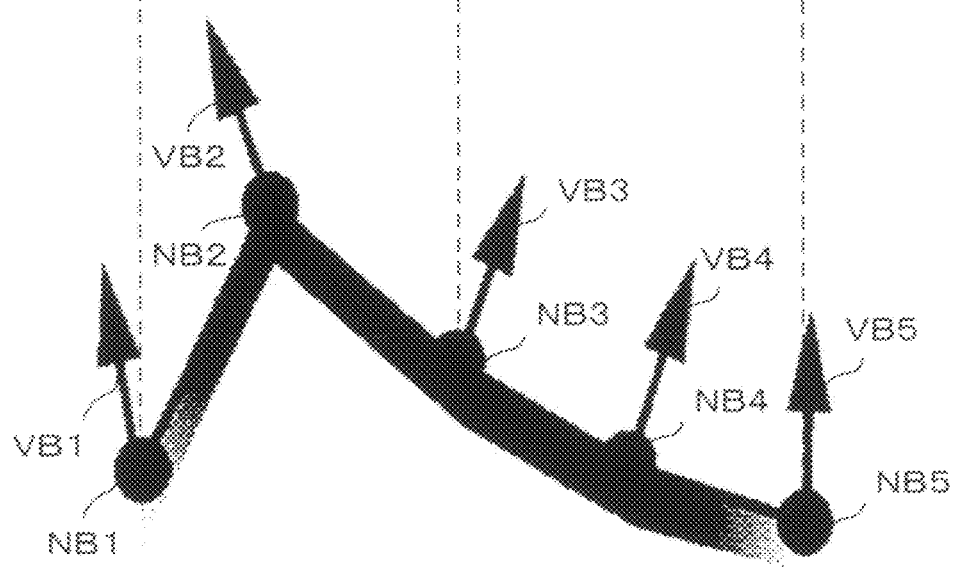
FIG. 15B is a diagram showing exemplary relations between normal vectors and polygons.

With reference to FIGS. 15 and 16, the normal vector image generation processing will be described. FIG. 15A and FIG. 15B are a diagram showing an exemplary relation between a normal vector and the polygon. The normal vector of a polygon vertex is calculated as an average value of the normal vectors of the polygon which includes the polygon vertex. Further, the normal vector of the polygon vertex is used for shading when an image of the curved surface SF (see FIG. 14) represented by the polygons is generated.

On the other hand, as described with reference to FIGS. 8 to 12, in the present invention, the virtual plane surface PL is divided in accordance with the distance from the virtual camera VP, and thus, regions in the vicinity of the virtual camera VP, among the regions generated in the virtual plane surface PL, may be divided in the plane surface division processing. When a region is divided in the plane surface division processing, triangle regions included in the region are also divided, and consequently, the triangle polygons in the region are divided, respectively.

For example, as shown in FIG. 15A, suppose a case where three polygon vertices NA1, NA3 and NA5 are arranged in the X-axis direction, as polygon vertices composing the polygon model of the curved surface SF (see FIG. 14). When virtual camera VP is moved closer to a region including the polygon vertices NA1, NA3 and NA5 and when the region is divided in the plane surface division processing, then five polygon vertices NB1 to NB5 are generated in the X-axis direction as shown in FIG. 15B. That is, with the result that the virtual camera VP is moved closer to the region including the polygon vertices NA1, NA3 and NA5, a surface whose shading is defined by the polygon vertices NA1, NA3 and NA5, respectively having the normal vectors VA1, VA3 and VA5, is changed to a surface whose shading is defined by polygon vertices NB1 to NB5, respectively having the normal vectors VB1 to VB5.

In this case, the normal vector VA3 corresponding to the polygon vertex NA3 is drastically changed to the normal vector VB3 corresponding to the polygon vertex NB3. That is, although the curved surface SF (see FIG. 14) is fixed and a position of a light source is not changed, the shading in the vicinity of the polygon vertex NA3 (the polygon vertex NB3) is changed drastically, which causes an unnatural change in the image.

Figure 16A:
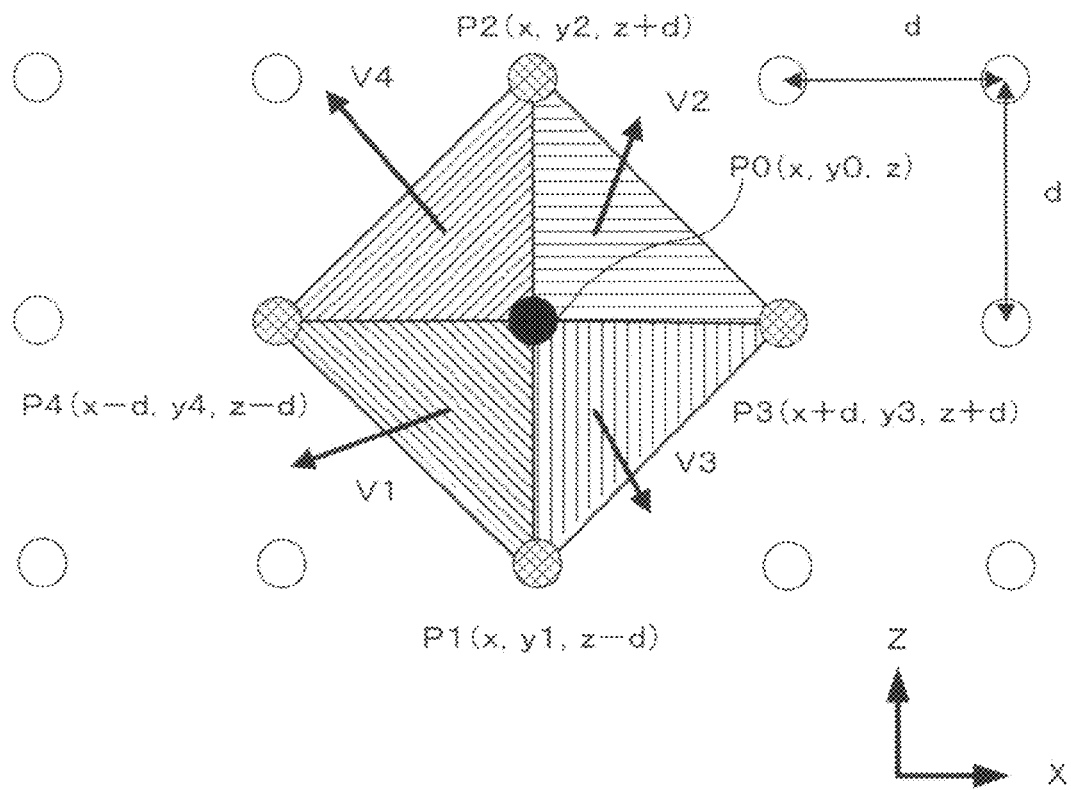
FIG. 16A is a diagram showing exemplary normal vector image generation processing.
Figure 16B:
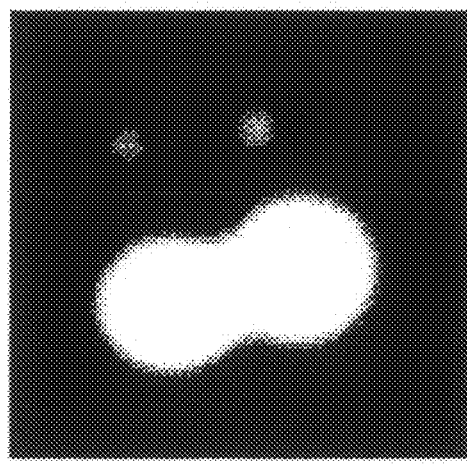
FIG. 16B is a diagram showing exemplary normal vector image generation processing.
Figure 16B:
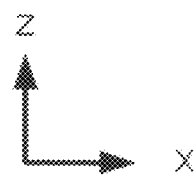
Figure 16C:
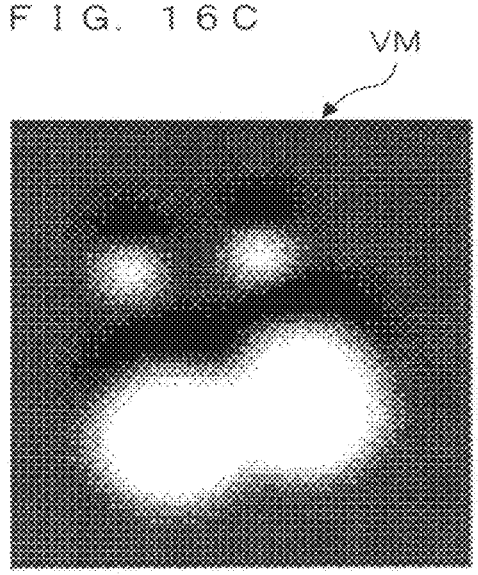
FIG. 16C is a diagram showing exemplary normal vector image generation processing.
Figure 16C:
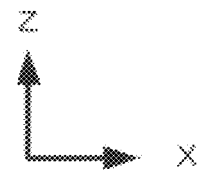

In order to solve this problem, in the present embodiment, normal vectors corresponding to respective pixels of the distance-containing image PM shown in FIG. 13A are generated by using the normal vector image to be described with reference to FIGS. 16A, 16B and 16C. FIGS. 16A, 16B and 16C are diagrams showing exemplary normal vector image generation processing. In the normal vector image generation processing (i.e., processing executed in "a reference point setting step", "an outer-circumference point setting step", "a second distance reading step", "a second coordinate point calculation step", and "a normal vector calculation step"), a normal vector image VM shown in FIG. 16c is generated from the distance-containing image PM shown in FIG. 13A (also shown in FIG. 16B).

Specifically, as shown in FIG. 16A, a reference point Q0 (not shown in the diagram since the point Q0 is positionally identical to a point P0 to be described later), which is a target point with respect to which normal vector information is generated, is set sequentially on the distance-containing image PM (corresponding to the pixels of the distance-containing image PM). The distance-containing image PM is interrelated to the distance information, and is stored in the internal main memory 11e. In the distance-containing image PM (i.e., virtual plane surface PL), two outer-circumference points Q1 and Q2 (not shown in the diagram since the points are positionally identical, respectively, to points P1 and P2 to be described later) are set. The two outer-circumference points Q1 and Q2 are distanced from the reference point Q0 by a predetermined unit distance d (the "unit distance d" corresponding to an "inter-pixel distance on the distance-containing image PM", in this case) in a predetermined first direction (i.e., the Z-axis direction). Further, two outer-circumference points Q3 and Q4 (not shown in the diagram since the points are positionally identical to points P3 and P4 to be described later) are set, the outer-circumference points Q3 and Q4 being respectively distanced from the reference point Q0 by the unit distance d in a second direction (i.e., the X-axis direction) perpendicular to the first direction (i.e., Z-axis direction). In the present embodiment, a case where the unit distance d corresponds to the inter-pixel distance on the distance-containing image PM will be described, however, the unit distance d may be any integer times (e.g., 4 times) longer than the inter-pixel distance on the distance-containing image PM.

Next, the distance information corresponding to the reference point Q0 and the four outer-circumference points Q1 to Q4 is read from the internal main memory 11e (the information corresponding to the distance-containing image PM shown in FIG. 16B). Next, calculated are coordinate points of positions to which the reference point Q0 and the four outer-circumference points Q1 to Q4 are respectively moved in parallel in a direction (the Y-axis direction) perpendicular to the virtual plane surface PL (i.e., the distance-containing image PM) by a distance indicated by the read distance information. Based on five points P0, P1 to P4 corresponding to the calculated coordinate points, normal vectors V1 to V4 of four triangle polygons (shaded areas shown in FIG. 16A) are calculated, respectively. The four triangle polygons each has vertices composed of the point P0 corresponding to the reference point Q0, either of P1 or P2 corresponding to either of two outer-circumference points Q1 or Q2 which is distanced from the reference point Q0 in the first direction (Z-axis direction), and either of P3 or P4 corresponding to either of the two outer-circumference points Q3 or Q4, which is distanced from the reference point Q0 in the second direction (the X-axis direction). An average value of the normal vectors V1 to V4 is then calculated, and is interrelated to the information indicative of the position of the reference point Q0 on the virtual plane surface PL so as to be stored in the internal main memory 11e.

The average value (the normal vector corresponding to the reference point Q0) of the normal vectors V1 to V4 is stored in the internal main memory 11e as image information in which respective positions and colors of the respective points composing the normal vector image VM shown in FIG. 16c correspond to the respective positions and the normal vectors on the curved surface SF (see FIG. 14). In other words, the positional information of the reference point Q0 is stored in the internal main memory 11e as the positional information of the normal vector image VM shown in FIG. 16c, and an X component, a Y component and a Z component of the normal vector corresponding to the reference point Q0 are stored in the internal main memory 11e as an R (red) color, a G (green) color, and a B (blue) color information of the normal vector image VM shown in FIG. 16c, respectively.

In this manner, the normal vector information is stored as the normal vector image VM, and thus the normal vector information can be stored efficiently. That is, a capacity required for storing the normal vector information can be reduced, and also the normal vector information can be read efficiently.

The present embodiment exemplifies the case where the normal vector information is stored as the color information (the RGB color information) of the image information. However, the normal vector information may be stored as other information (e.g., the α value indicative of a degree of transparency or the like) corresponding to pixels composing the image. Further, although the present embodiment exemplifies the case where the normal vector image VM is stored in the internal main memory 11e, the normal vector image VM may be stored in another storage means (e.g., the flash memory 17 or the like).

In the present embodiment, the normal vector image VM is preliminarily generated and stored in the internal main memory 11e, and at the time when a game is started, the normal vectors, which correspond to the polygon vertices and which are used for shading, are respectively read and set as color information (RGB information) of the normal vector image VM stored in the internal main memory 11e. In this manner, the normal vectors are set based on the normal vector image VM. Therefore, even in the case where the number of divisions is changed due to a movement of the virtual camera VP or the like, changes in the normal vector of the polygon vertices can be minimized. Accordingly, images can be displayed without bringing a sense of discomfort. Further, since the normal vector image VM is preliminarily stored in the internal main memory 11e, the normal vectors corresponding to the polygon vertices can be calculated efficiently.

In the present embodiment, the case where the normal vector image VM is preliminarily generated and stored in the internal main memory 11e before the game is started is described. However, in the case where one curved surface is selectable from among a plurality of preliminarily set curved surfaces SF (see FIG. 14) during the game, the normal vector image VM may be generated, at a timing when the one curved surface SF is selected, based on the distance-containing image PM corresponding the selected curved surface SF. In this case, the normal vector image VM does not need to be stored preliminarily, and thus a capacity required for storing the normal vector image VM can be reduced.

Figure 17:
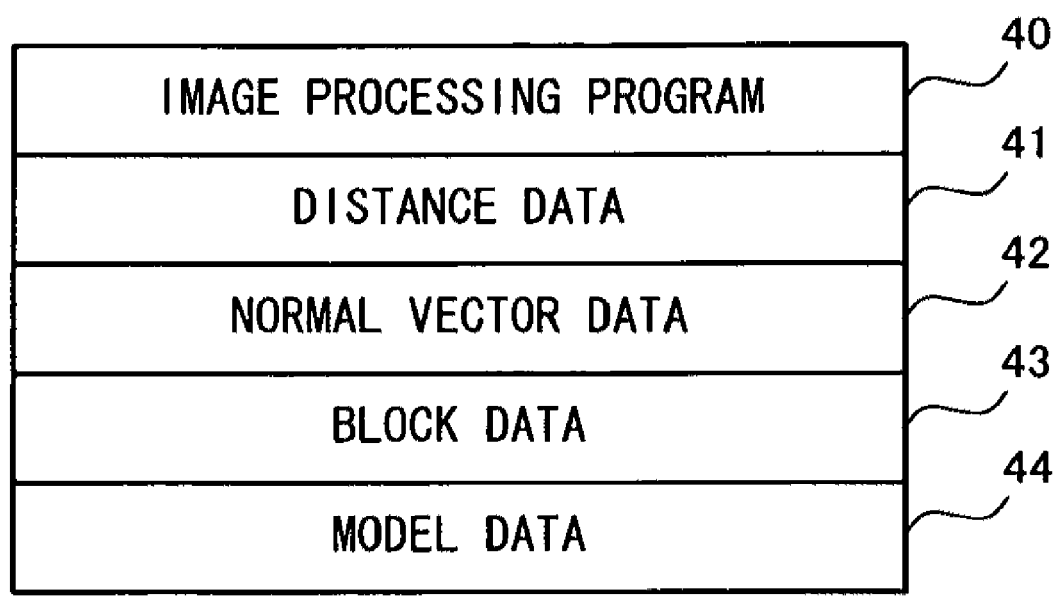
FIG. 17 is a memory map in an internal main memory.

Hereinafter, with reference to FIGS. 17 to 21, an operation of the game apparatus 3 will be described. FIG. 17 is an exemplary memory map of the internal main memory 11e. Data which is not important in the present invention is omitted from the diagram. Instead of the internal main memory 11e, the external main memory 12, the flash memory 17 or the like may be used. In the internal main memory 11e, an image processing program 40, distance data 41, normal vector data 42, block data 43 and model data 44 are stored.

The image processing program 40 is a computer program for causing a computer (the CPU 10 or the GPU 11b) to execute processing described in flowcharts shown in FIGS. 18 to 21. In the present embodiment, the image processing program 40 is loaded from the optical disc 4 to the internal main memory 11e. The image processing program 40 may be provided not only from the optical disc 4 but also from any other arbitrary external storage medium. Alternatively, the image processing program 40 may be provided from another computer system via a wired or wireless communication line, or may be preliminarily stored in an involatile storage device such as the flash memory 17 embedded in the game apparatus 3.

The distance data 41 is data composing the distance-containing image PM shown in FIG. 13A, and stores therein the distance information by interrelating the distance information to the positional information. The distance data 41 is typically loaded from the optical disc 4 to the internal main memory 11e.

The normal vector data 42 is data composing the normal vector image VM shown in FIG. 16c, and stores therein the normal vector information by interrelating the normal vector information to the positional information. The normal vector data 42 is generated based on the distance data 41 by the CPU 10 (or the GPU 11b), and stored in the internal main memory 11e.

As above described, in the case where the distance information is stored as the α value information, and the normal vector information is stored as the RGB information, it is preferable that the distance data 41 and the normal vector data 42 are stored as one piece of image data. That is, the distance information and the normal vector information are interrelated to the positional information indicative of positions of the pixels (grid points arranged at regular intervals) on the virtual plane surface PL shown in FIG. 8, and then the distance information is stored as the α value information, whereas the normal vector information is stored as the RGB information, Accordingly, a required storage capacity can be reduced.

With respect to each of the regions generated in the plane surface division processing described with reference to FIGS. 8 to 12 (hereinafter referred to as "blocks" in order to distinguish the regions from the triangle regions), the block data 43 stores therein an X coordinate and a Z coordinate of a central position of each of the blocks and the number of times to divide each of the blocks. The block data 43 is generated and stored by the CPU 10 (or the GPU 11b).

The model data 44 stores therein the polygon data (coordinate point data, normal vector data and the like of the polygon vertices) generated in the polygon generation processing described with reference to FIGS. 13 and 14 by interrelating the polygon data to the block data 43. The model data 44 is generated by the CPU 10 (or the GPU 11b), and stored in the internal main memory 11e.

Figure 18:
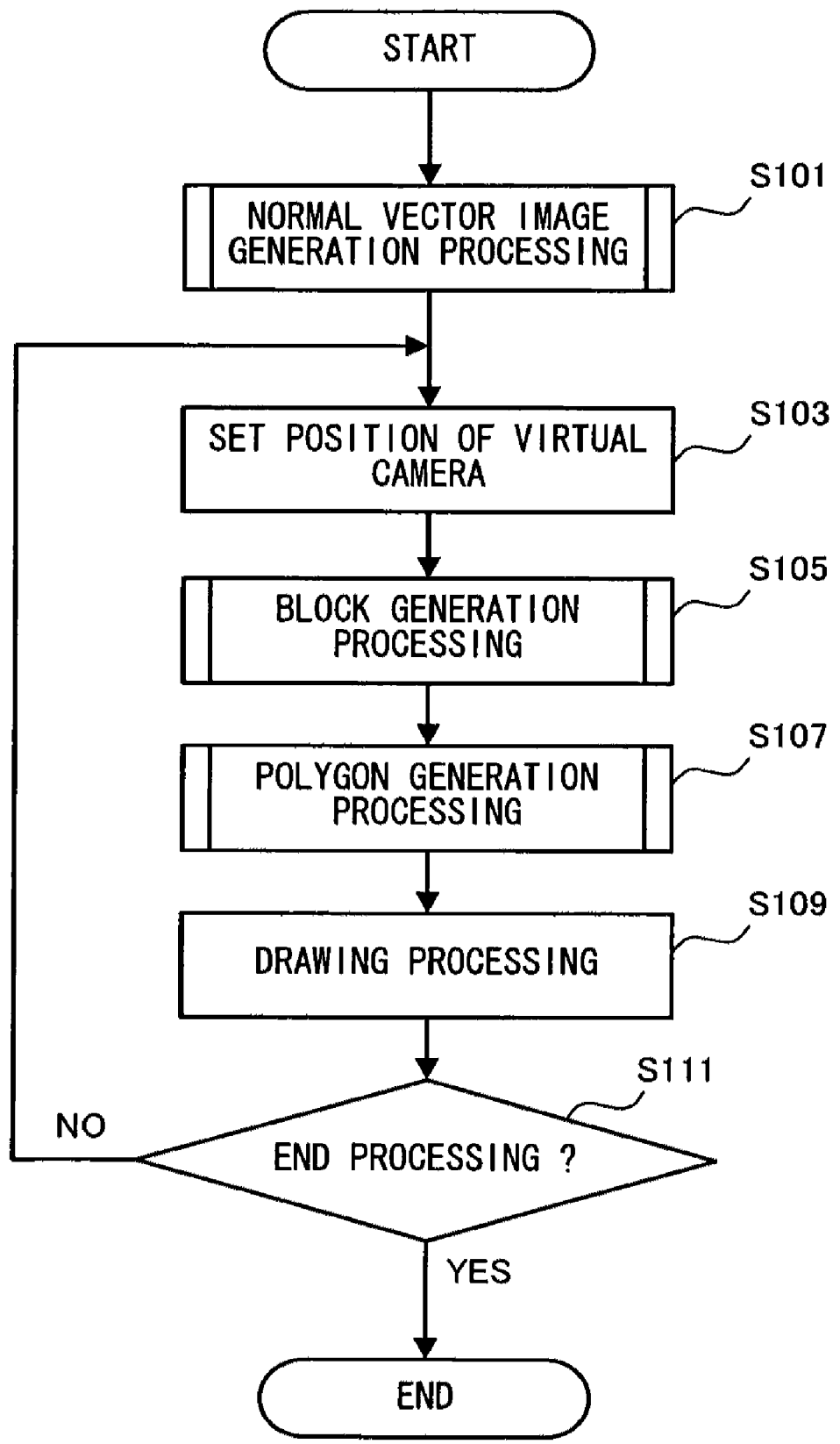
FIG. 18 is a flowchart showing an exemplary operation of a CPU (or a GPU)

With reference to the flowcharts shown in FIGS. 18 to 21, an operation of the CPU 10 (or the GPU 11b) based on the image processing program 40 will be described. Processing of respective steps in each of the flowcharts shown in FIGS. 18 to 21 may be executed by either the CPU 10 or the GPU 11b. Either the CPU 10 or the GPU 11b, which is appropriate to each of the steps, may execute the processing. FIG. 18 is a flowchart showing an exemplary operation of the CPU (GPU). In the present embodiment, the processing of steps S101 to S107 and step S111 in the flowchart shown in FIG. 18 is executed by the CPU 10, whereas the processing of step S109 in the flowchart shown in FIG. 18 is executed by the GPU 11b.

When an execution of the image processing program 40 is started, a series of processing in the flowchart shown in FIG. 18 are started. Processing of selecting a curved surface to be displayed or the like may be added to the flowchart shown in FIG. 18, in accordance with an external input performed by the user or other conditions.

In step S101, the CPU 10 generates the normal vector data 42 in accordance with the distance data 41 and records the normal vector data 42 in the internal main memory 11e. The normal vector image generation processing executed in step S101 will be described later in detail with reference to FIG. 19. In step S103, in response to an instruction from the controller 7, the CPU 10 sets a position of the virtual camera VP.

In step S105, the CPU 10 generates the block data 43 in accordance with the position of the virtual camera VP set in step S103, and records the block data 43 in the internal main memory 11e. The block generation processing executed in step S105 will be described later in detail with reference to FIG. 20.

In step S107, the CPU 10 generates the model data 44 in accordance with the block data 43 generated in step S105, and records the model data 44 in the internal main memory 11e. The polygon generation processing executed in step S107 will be described later in detail with reference to FIG. 21.

In step S109, the GPU 11b draws the curved surface SF in accordance with the model data 44 generated in step S107. Specifically, the GPU 11b reads the model data 44 from the internal main memory 11e, and draws the curved surface SF in a frame memory in the VRAM 11d. In step S111, in response to the instruction from the controller 7, the CPU 10 determines whether or not to terminate the image processing. When the CPU 10 determines to terminate the image processing (YES in S111), the CPU 10 terminates the image processing. When the CPU 10 determines not to terminate the image processing (NO in S111), the CPU 10 returns the processing to step S103, and repeats execution of the processing of step S103 and thereafter.

The above-described processing from step S103 to step S111 is repeated at one-frame cycle (e.g., at a cycle of 1/60 sec.), and consequently, moving images indicative of the curved surface SF are displayed on a screen of the television 2.

The present embodiment is exemplified by a case where, in step S101, the CPU 10 generates normal vector data 42 in accordance with the distance data 41, and records the generated normal vector data 42 in the internal main memory 11e. However, the normal vector data 42 may be generated preliminarily and stored in the internal main memory 11e or the like. In this case, the processing for generating the normal vector data 42 is not necessary, and thus the processing is simplified.

Figure 19:
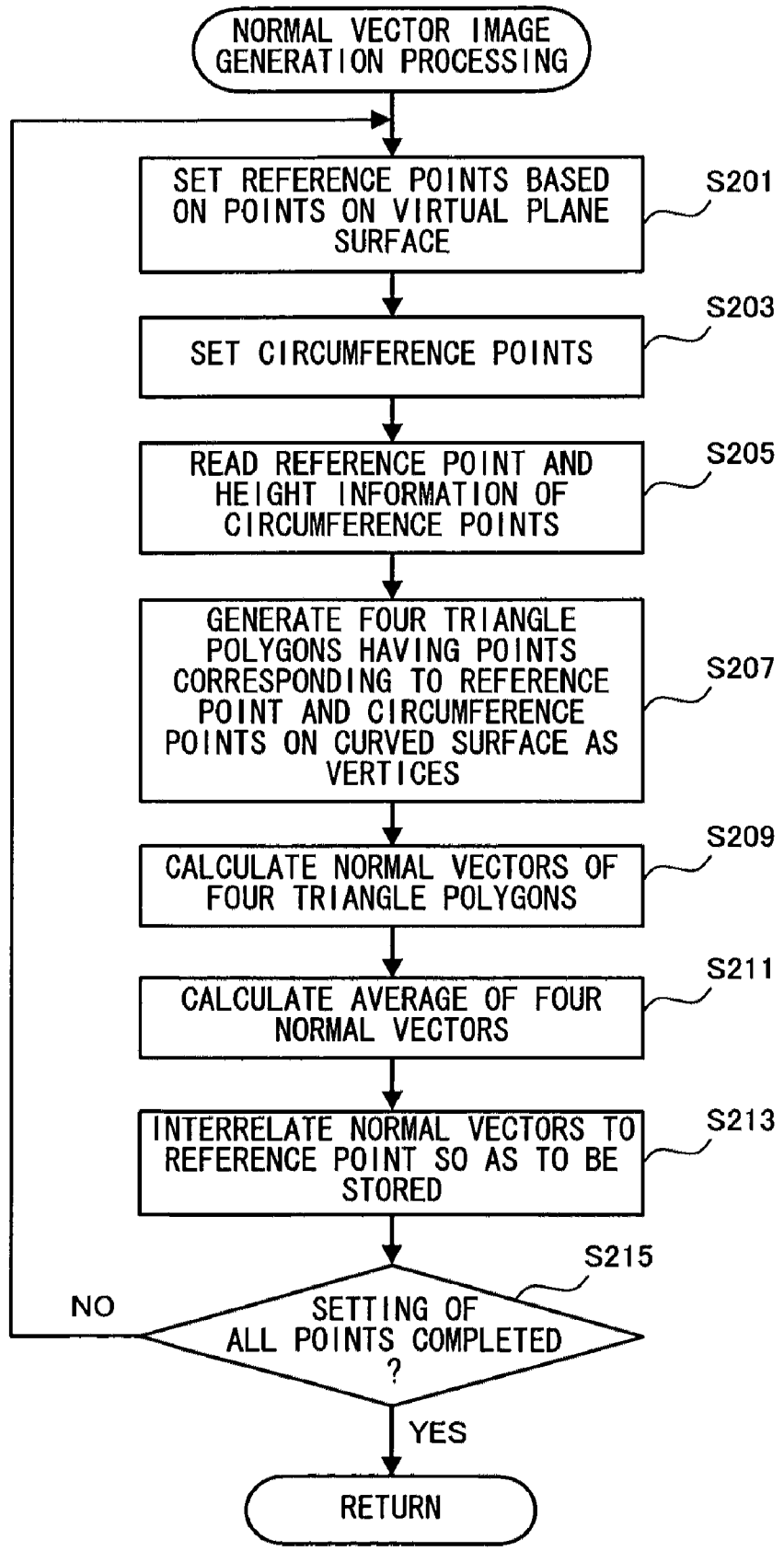
FIG. 19 is a flowchart showing, in detail, exemplary normal vector image generation processing executed in step S101 in the flowchart shown in FIG. 18.

FIG. 19 is a flowchart showing, in detail, exemplary normal vector image generation processing executed in step S101 in flowchart shown in FIG. 18. With reference to FIG. 16, the normal vector image generation processing will be described. In step S201, the CPU 10 sets the reference point Q0, which is the target point with respect to which the normal vector information is generated, in accordance with the respective points on the virtual plane surface PL (i.e., executes the "reference point setting step"). In step S203, the CPU 10 sets the outer-circumference points Q1 to Q4 in accordance with each of the reference points Q0 set in step S201 (i.e., executes the "outer-circumference point setting step").

In step S205, the CPU 10 reads, from the internal main memory 11e, the distance information corresponding to each of the reference point Q0 and the outer-circumference points Q1 to Q4 set in steps S201 and S203 (i.e., executes the "second distance reading step"). In step S207, the CPU 10 generates four triangle polygons, and the vertices thereof are selected from the points P0 to P4 on the curved surface SF (i.e., executes the "second coordinate point calculation step), the points P0 to P4 corresponding to the reference point Q0 and the outer-circumference points Q1 to Q4, respectively. In step S209, the CPU 10 calculates the normal vectors V1 to V4 of the four triangle polygons generated in step S207 (i.e., executes the "normal vector calculation step"). In step S211, the CPU 10 calculates the average value of the four normal vectors V1 to V4 generated in step S209 (i.e., executes the "average calculation step"). In step S213, the CPU 10 interrelates the calculated average value to the information indicative of the position of the reference point Q0 on the virtual plane surface PL so as to be recorded in the internal main memory 11e.

In step S215, the CPU 10 determines whether or not all the points on the virtual plane surface PL (all the pixels on the distance-containing image PM) have been set as the reference points Q0. When all the points on the virtual plane surface PL are determined to have been set as the reference points Q0 (YES in step S215), the CPU 10 returns the processing to S103. When all the points on the virtual plane surface PL are determined not to have been set (NO in S215), the CPU 10 returns the processing to step S201, sets points yet to be set as reference points Q0 in step S201, and repeats the processing in step S201 and thereafter.

Figure 20:
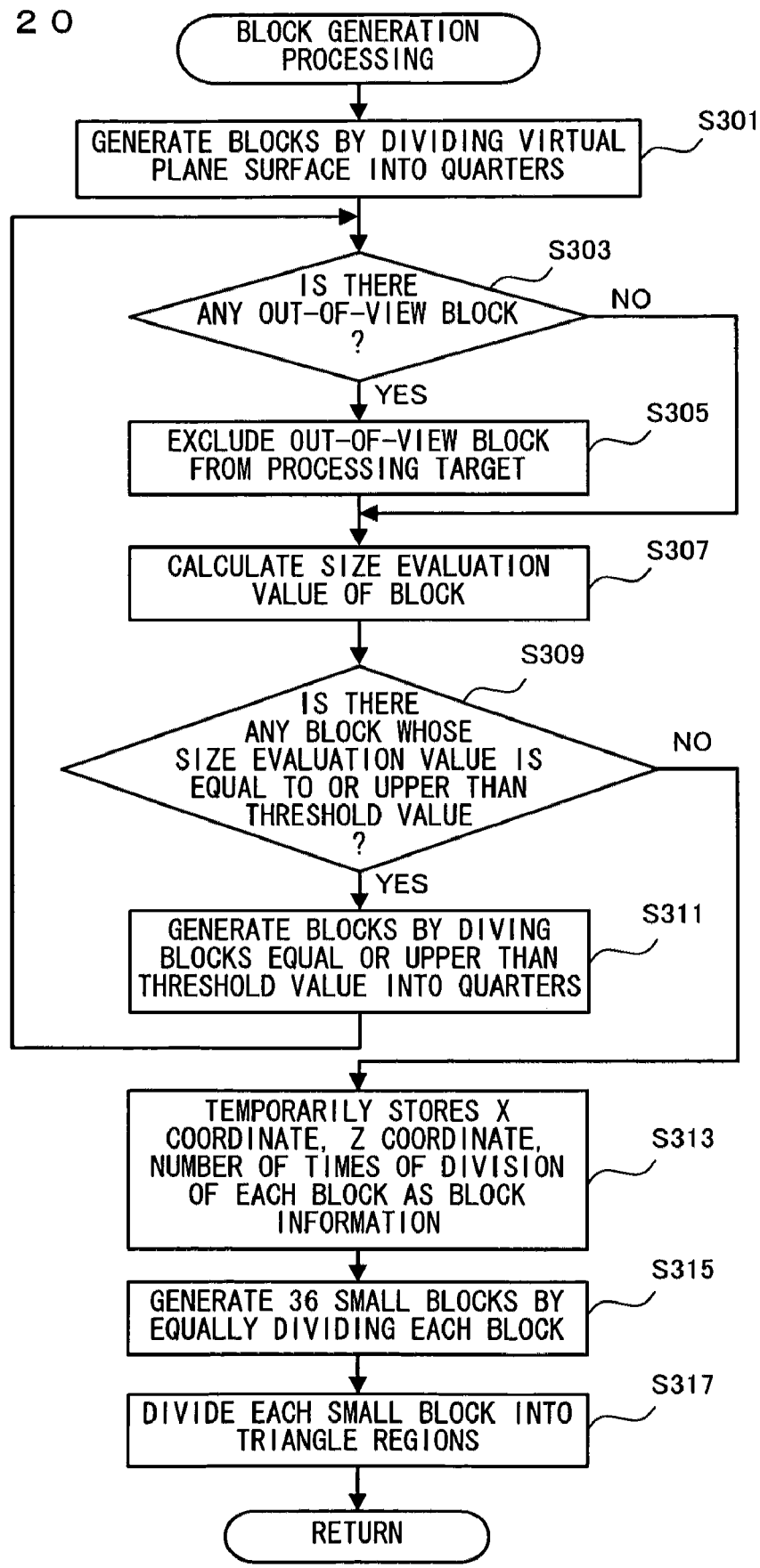
FIG. 20 is a flowchart showing, in detail, exemplary block generation processing executed in step S105 in the flowchart shown in FIG. 18.

FIG. 20 is a flowchart showing, in detail, exemplary block generation processing executed in step S105 in the flowchart shown in FIG. 18. With reference to FIGS. 8 to 12, the block generation processing is described. In step 301, the CPU 10 divides the virtual plane surface PL into four blocks, i.e., blocks PL11 to PL14 (i.e., executes the "first division step", see FIG. 8). In step 303, the CPU 10 determines whether or not any of the blocks generated in step S301 (or in step S311) is outside the field of view of the virtual camera VP (i.e., executes the "field of view determination step", see FIG. 9).

When it is determined that no block is outside the field of view (NO in step S303), the CPU 10 proceeds to the processing in step S307. When it is determined that some block is outside the field of view (YES in step S303), the CPU 10 excludes, in step 305, the block outside the field of view from target blocks to be processed (i.e., executes the "region exclusion step", see FIG. 8). In the case of NO in step S303, or in the case where the processing in step S305 is terminated, in step S307, the CPU 10 calculates the size evaluation value of each of the blocks (which are not excluded from the target blocks to be processed in step S305, among the blocks generated in step S301 or in step 311) (i.e., executes the "size evaluation value calculation step", see FIG. 10).

In step S309, the CPU 10 determines whether or not there is any block whose size evaluation value calculated in step S307 is equal to or more than the predetermined threshold value (a block needs to be further divided). That is, the CPU 10 executes a "division necessity determination step". When it is determined that there is no block which needs to be divided (NO in S309), the CPU 10 proceeds to the processing in step S313. When it is determined that there is some block which needs to be divided (YES in S309), the CPU 10 equally divides the block, which is necessary to be divided, into four blocks, respectively (i.e., executes the "second division step"), and returns to the processing in step S303. The CPU 10 then repeats the processing in step S303 and thereafter until it is determined that there is no block which needs to be divided (NO in step S309).

In the case of NO in step S309, the CPU 10 temporarily stores, in step S313, the X coordinate and the Z coordinate of the central position of each of the blocks and the number of times to divide each of the blocks generated in step S301 or in step S311 into the internal main memory 11e shown in FIG. 2 as the block data (see FIG. 17). In step S315, the CPU 10 generates 36 small blocks by equally dividing each of the blocks generated in step S301 or in step S311 (i.e., executes the "re-division step", see FIG. 11). In step S317, the CPU 10 divides the small blocks generated in step S315 into the triangle regions (executes a part of the "triangle generation step", see FIG. 11), and returns the processing to step S107 (see FIG. 18).

In the present embodiment, the case is described where, in step S313, the CPU 10 records the block data in the internal main memory 11e. However, the block data may be stored in another memory (such as the flash memory 17).

Figure 21:
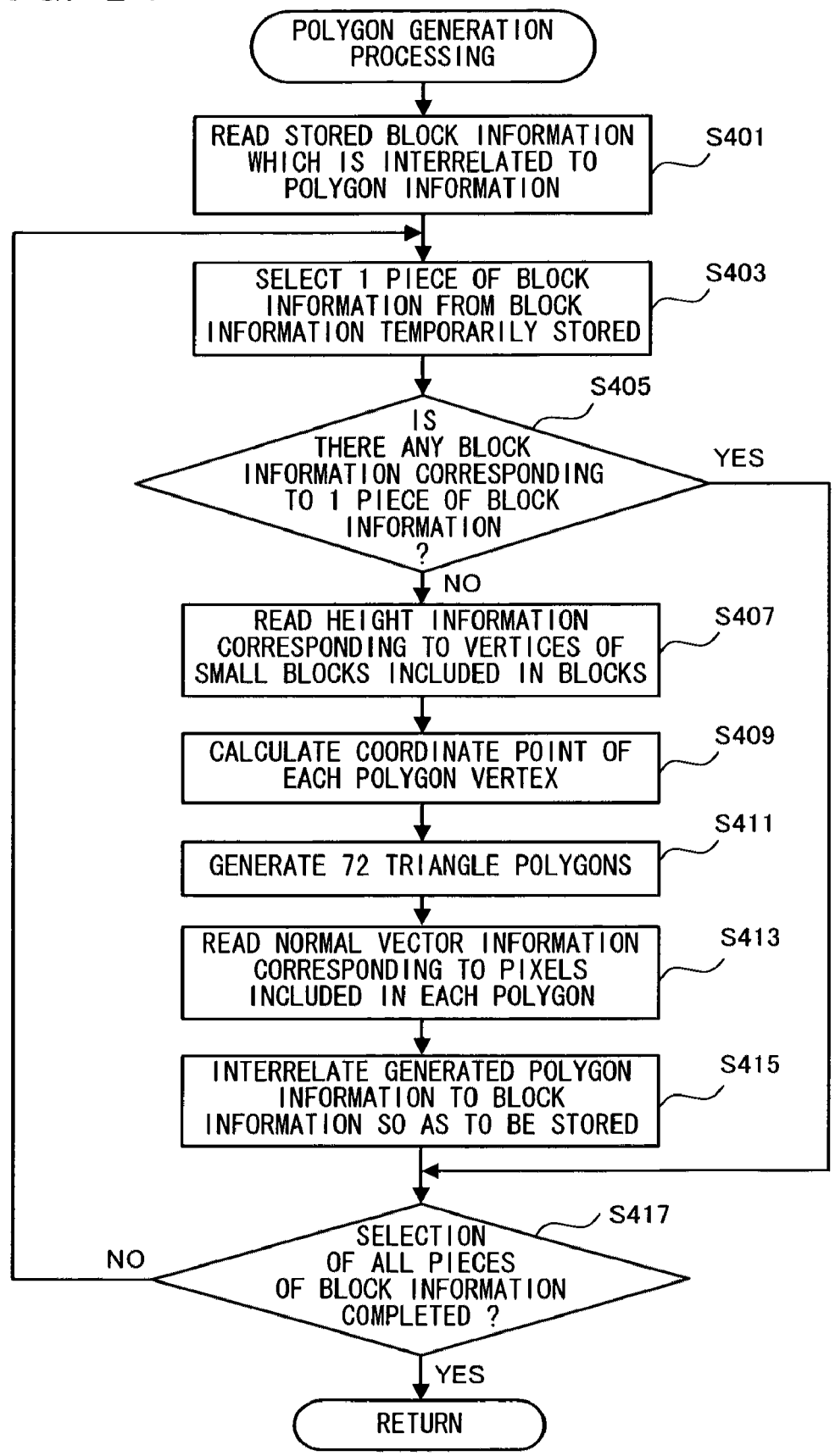
FIG. 21 is a flowchart showing, in detail, exemplary polygon generation processing executed in step S107 in the flowchart shown in FIG. 18.

Further, in the present embodiment, the case is described where, in step S315, each of the blocks generated in step S301 or in step S311 are equally divided into the 36 small blocks, the small blocks are divided into the triangle regions in step S317, and then, in step S413 in the flowchart shown in FIG. 21, the triangle polygons corresponding to the triangle regions are generated. However, each of the blocks generated in step S301 or in step S311 is divided into the triangle regions, and the triangle polygon corresponding to the triangle regions may be generated in step S413 in the flowchart shown in FIG. 21 (i.e., the triangle regions may be generated without the "re-division step" being executed).

FIG. 21 is a flowchart showing, in detail, exemplary polygon generation processing executed in step S107 in the flowchart shown in FIG. 18. In step S401, the CPU 10 reads the block data 43 which is interrelated to the model data 44 and stored in the internal main memory 11e in step S415 in a most recent run of the polygon generation processing. In step S403, the CPU 10 selects and reads one piece of block data from the block data 43 stored in the internal main memory 11e in step S313 in the flowchart shown in FIG. 20.

In step S405, the CPU 10 determines whether or not, in the block data 43 read in step S401, there is some piece of block data which corresponds to the piece of the block data read in step S403. That is, the CPU 10 determines whether or not, in the block data 43, there is any piece of block data, with respect to which polygons have been generated in the most recent run of the polygon generation processing or therebefore and which has been interrelated to the model data 44 and stored in the internal main memory 11e. When it is determined that there is some piece of such block data included in the block data 43 (YES in S405), the CPU 10 proceeds to the processing in step S417. When it is determined that there is no piece of such block data included in the block data 43 (NO in S405), the CPU 10 reads, in step S407, from the distance data 41 stored in the internal main memory 11e, the distance information corresponding to each of the vertices of the small blocks included in the block data read in step S403 (i.e., executes the "first distance reading step").

In step S409, the CPU 10 calculates, by using the distance information read in step S407, the coordinate points of the polygon vertices corresponding to the vertices of the small blocks included in the block data read in step S403 (i.e., executes the "first coordinate point calculation step"). In step S411, the CPU 10 generates, for each piece of the block data read in step S403, 72 triangle polygons (see FIG. 11B) by using the coordinate points of the polygon vertices calculated in step S409 (i.e., the "triangle generation step" is executed). In step S413, the CPU 10 reads the normal vector information, which corresponds to the pixels included in the triangle polygons generated in step S411, from the normal vector data 42 stored in the internal main memory 11e (i.e., the "normal vector reading step" and the "normal vector setting step" are executed).

In step S415, the CPU 10 uses the polygon data generated in steps S411 and S413 as the model data 44, and interrelates the model data to the block data 43 read in step S403 so as to be stored in the internal main memory 11e. When the processing in step S415 is terminated, or in the case of YES in step S405, the CPU 10 determines, in step S417, whether or not the selection of all pieces of the block data stored in the internal main memory 11e is completed. When it is determined that the selection of all the pieces of the block data is completed (YES in S417), the CPU 10 returns the processing to step S109 (see FIG. 18). When it is determined that the selection of all the pieces of block data is yet to be completed (NO in S417), the CPU 10 returns the processing to step S403, and selects one piece of the block data, which is yet to be selected. The CPU 10 repeatedly executes the processing in step S403 and thereafter until it is determined, in step S417, that the selection of all pieces of the block data is completed.

In this manner, in the polygon generation processing shown in FIG. 21, polygons are generated with respect to a piece of block data, in the case where the piece of the block data is not included in the block data 43 which includes pieces of block data whose polygons have been generated and whose model data 44 has been stored in the internal main memory 11e in the most recent run of the polygon generation processing or therebefore, (i.e., in the case where the piece of the block data corresponds to a block which is newly generated in current block generation processing). Therefore, the processing can be simplified.

That is, in the case where the model data 44 generated in the most recent run of the polygon generation processing or therebefore is identical to the model data generated in the current polygon generation processing, the model data will not be generated in the current polygon generation processing. In other words, in the case where a piece of block data, which is generated in the current polygon block generation processing (see FIG. 20) and which is stored in the internal main memory 11e, is identical to another piece of block data whose model data is already stored in the internal main memory 11e, then the model data 44 generated in the most recent run of the polygon generation processing or therebefore is read from the internal main memory 11e and used for generating, in the current flow of the polygonal block generation processing, the polygon model of the piece of block data. Therefore, the processing can be simplified.

As above described, according to the present embodiment, it is possible to generate appropriate polygon information (i.e., the model data 44) which is capable of securing the quality of the images viewed from the virtual camera VP and which requires a small amount of storage capacity.

The present invention is applicable to an image processing program and an image processing device of a game apparatus or the like. Particularly, the present invention is applicable to an image processing program and an image processing apparatus for drawing an image of a curved surface (e.g., a curved surface indicative of a landform) as viewed from a virtual camera situated in a virtual three-dimensional space, the curved surface being arranged in the virtual three-dimensional space and having undulations which are defined in accordance with distances from a virtual plane surface which is also arranged in the virtual three-dimensional space.

While the invention has been described in detail, the foregoing description is in all aspects illustrative and not restrictive. It is understood that numerous other modifications and variations can be devised without departing from the scope of the invention.

What is claimed is:

1. A non-transitory computer readable storage medium having stored thereon an image processing program for drawing an image of a curved surface as viewed from a virtual camera situated in a virtual three-dimensional space, an undulation of the curved surface being defined by a distance from a virtual plane surface arranged in the virtual three-dimensional space, the image processing program causing a computer to execute instructions comprising:

dividing the virtual plane surface into a plurality of polygonal shape regions such that the closer a region is to the virtual camera, the smaller areas the region is divided into;

calculating a size evaluation value indicative of a size of an image of each of the plurality of the polygonal shape regions based on a distance of the virtual camera with respect to each of the plurality of the polygonal shape regions;

dividing each of the plurality of the polygonal shape regions such that the calculated size evaluation value becomes equal to or lower than a predetermined threshold value;

reading, from a storage unit, distance information indicative of distance from the virtual plane surface, with respect to respective vertices of the plurality of polygonal shape regions;

calculating coordinate points of position which are respectively distanced from the vertices composing the plurality of polygonal shape regions by distances indicated by the distance information in a direction perpendicular to the virtual plane surface;

generating polygons by using the calculated coordinate points as polygon vertices which define the polygons, the number of the polygons being substantially constant in each of the plurality of the polygonal shape regions; and drawing an image of the generated polygons, the image drawn as being viewed from the virtual camera.

2. The non-transitory computer readable storage medium having stored thereon the image processing program according to claim 1, wherein the size evaluation value is calculated as an area of an image of a sphere having a great circle which is inscribed in or circumscribed around each of the plurality of polygonal shape regions, the area of the image as being viewed from the virtual camera.

3. The non-transitory computer readable storage medium having stored thereon the image processing program according to claim 1, further comprising:
dividing the virtual plane surface into a first predetermined number of regions;
determining, with respect to each of the first predetermined number of regions, whether or not the calculated size evaluation value is equal to or lower than the threshold value; and
further dividing a region, among the first predetermined number of regions, whose size evaluation value is determined not to be equal to or lower than the threshold value, into the first predetermined number of regions,
determining, with respect to further divided respective regions, whether or not the size evaluation value thereof calculated is equal to or lower than the threshold value, and
repeatedly executing the further dividing the region and the determining, with respect to the further divided respective regions, until the size evaluation value of all the generated regions become equal to or lower than the threshold value.

4. The non-transitory computer readable storage medium having stored thereon the image processing program according to claim 3, wherein
the virtual plane surface is equally divided into the first predetermined number of regions, and
the region, among the first predetermined number of regions, whose the size evaluation value is determined not to be equal to or lower than the threshold value, is equally divided into the first predetermined number of regions.

5. The non-transitory computer readable storage medium having stored thereon the image processing program according to claim 4, wherein
the virtual plane surface is a quadrangular plane surface,
the polygonal shape is of a quadrangular shape,
the quadrangular virtual plane surface is divided into quarters by two straight lines which are each formed by connecting middle points of two facing sides of the quadrangular virtual place surface, and
the quadrangular region, whose size evaluation value is determined not to be equal to or lower than the threshold value, is divided into quarters by two straight lines which are each formed by connecting middle points of two facing sides of the quadrangular region.

6. The non-transitory computer readable storage medium having stored thereon the image processing program according to claim 5, wherein two triangle polygons are generated corresponding to two triangle regions obtained by dividing each of the quadrangular regions by a diagonal line therethrough.

7. The non-transitory computer readable storage medium having stored thereon the image processing program according to claim 5, further comprising:
dividing each of the generated plurality of polygonal shape regions into a second predetermined number of small regions which are each of a quadrangular shape;
reading the distance information of respective vertices composing each of the quadrangular small regions from the storage unit;
calculating coordinate points of positions which are respectively distanced from of the vertices composing each of the generated quadrangular small regions by distances indicated by the distance information in a direction perpendicular to the virtual plane surface; and
generating polygons respectively having the calculated coordinate points as the polygon vertices.

8. The non-transitory computer readable storage medium having stored thereon the image processing program according to claim 7, further comprising:
generating two triangle polygons corresponding to two triangle regions which are obtained by dividing each of the quadrangular small regions by a diagonal line therethrough.

9. The non-transitory computer readable storage medium having stored thereon the image processing program according to claim 8, further comprising:
dividing each of the generated quadrangular regions into an even number of small regions, respectively, in two directions along the adjacent sides of each of the quadrangular region;
extracting outer-circumference small regions, from among the second predetermined number of small regions, which each includes a part of sides composing each of the generated quadrangular regions as at least one of sides composing each of the small regions; and
selecting, with respect to outer-circumference small regions, among the extracted outer-circumference small regions, which include vertices composing each of the generated quadrangular regions, diagonal lines including the vertices as diagonal lines for dividing the quadrangular outer-circumference small regions, and also of selecting, with respect to outer-circumference small regions, among the extracted outer-circumference small regions, which do not include the vertices composing each of the generated quadrangular regions, the diagonal lines for dividing the quadrangular outer-circumference small regions such that the diagonal lines of the outer-circumference small regions adjoining respectively are approximately perpendicular to each other.

10. The non-transitory computer readable storage medium having stored thereon the image processing program according to claim 1, further comprising:
determining whether or not each of the generated polygonal shape regions is in an out-of-view region, which is not included in the image as viewed from the virtual camera; and
excluding a region, among the generated polygonal shape regions, which is determined to be in the out-of-view region, from target regions which are subject to processing.

11. The non-transitory computer readable storage medium having stored thereon the image processing program according to claim 1, further comprising:
setting points on the virtual plane surface, the points being interrelated to the distance information and stored in the storage medium, as reference points with respect to which normal vector information is generated;
setting, on the virtual plane surface, two points which are distanced from each reference point by a predetermined unit distance in a predetermined first direction, and of setting another two points which are distanced from each reference point by the unit distance in a second direction which is perpendicular to the first direction;

reading, from the storage medium, the distance information on each set reference point and on the set four points;

calculating coordinate points of positions which are respectively distanced from each reference point and the four points by distances indicated by the distance information in a direction perpendicular to the virtual plane surface;

calculating normal vectors of four triangle polygons, which each includes as vertices thereof, a point corresponding to each reference point, a point corresponding to either of the two points which are distanced from each reference point in the first direction, and a point corresponding to either of the two points which are distanced from each reference point in the second direction, among the calculated five coordinate points; and calculating an average value of the calculated four normal vectors, and of interrelating the average value to information indicative of the position of each reference point on the virtual plane surface so as to be stored in the storage medium;

reading a normal vector from the storage medium and setting the normal vector to each of the polygon vertices.

12. The non-transitory computer readable storage medium having stored thereon the image processing program according to claim 1, further comprising:

reading, from the storage medium, normal vector information indicative of a tilt of the curved surface at each of the calculated coordinate points; and setting the read normal vector information as the normal vector information of each of the polygon vertices corresponding to each of the coordinate points.

13. The non-transitory computer readable storage medium having stored thereon the image processing program according to claim 12, wherein, in the storage unit, the normal vector information is stored as image information such that positions and colors composing the image correspond to respective positions and normal vectors on the curved surface, respectively.

14. The non-transitory computer readable storage medium having stored thereon the image processing program according to claim 1, wherein, in the storage unit, the distance information is stored as image information such that positions and colors composing the image correspond to respective positions on the curved surface and distances from the virtual plane surface, respectively.

15. The non-transitory computer readable storage medium having stored thereon the image processing program according to claim 1, wherein the curved surface is a landform arranged in the virtual three-dimensional space.

16. An image processing apparatus for drawing an image of a curved surface as viewed from a virtual camera situated in a virtual three-dimensional space, an undulation of the curved surface being defined by a distance from a virtual plane surface arranged in the virtual three-dimensional space, the image processing apparatus having one or more processors and comprising:

a plane surface division unit for dividing the virtual plane surface into a plurality of polygonal shape regions such that the closer a region is to the virtual camera, the smaller areas the region is divided into, calculating a size evaluation value indicative of a size of an image of each of the plurality of the polygonal shape regions based on a distance of the virtual camera with respect to each of the plurality of the polygonal shape regions, and dividing each of the plurality of the polygonal shape regions such that the calculated size evaluation value becomes equal to or lower than a predetermined threshold value;

a first distance reading unit for reading, from a storage unit, distance information indicative of the distance from the virtual plane surface, with respect to respective vertices of the plurality of polygonal shape regions;

a first coordinate point calculation unit for calculating coordinate points of positions which are respectively distanced from each of the vertices composing the polygons corresponding to the plurality of polygonal shape regions by distances indicated by the distance information read by the first distance reading unit in a direction perpendicular to the virtual plane surface;

a polygon generation unit for generating polygons by using the coordinate points calculated by the first coordinate point calculation unit as polygon vertices defining each of the polygons, the number of the polygons being substantially constant in each of the plurality of the polygonal shape regions; and a drawing unit for drawing an image of the polygons which are generated by the polygon generation unit, the image as being viewed from the virtual camera.

17. A method for drawing an image of a curved surface as viewed from a virtual camera situated in a virtual three-dimensional space, an undulation of the curved surface being defined by a distance from a virtual plane surface arranged in the virtual three-dimensional space, the method being executed using a computer having one or more processors, the method comprising:

dividing the virtual plane surface into a plurality of polygonal shape regions such that the closer a region is to the virtual camera, the smaller areas the region is divided into;

calculating a size evaluation value indicative of a size of an image of each of the plurality of the polygonal shape regions based on a distance of the virtual camera with respect to each of the plurality of the polygonal shape regions;

dividing each of the plurality of the polygonal shape regions such that the calculated size evaluation value becomes equal to or lower than a predetermined threshold value;

reading, from a storage unit, distance information indicative of distance from the virtual plane surface, with respect to respective vertices of the plurality of polygonal shape regions;

calculating coordinate points of position which are respectively distanced from the vertices composing the plurality of polygonal shape regions by distances indicated by the distance information in a direction perpendicular to the virtual plane surface;

generating polygons by using the calculated coordinate points as polygon vertices which define the polygons, the number of the polygons being substantially constant in each of the plurality of the polygonal shape regions; and drawing an image of the generated polygons, the image drawn as being viewed from the virtual camera.

18. An image processing system, comprising:
a display device configured to display image data; and
an image processing apparatus for drawing an image of a curved surface
as viewed from a virtual camera situated in a virtual three-dimensional space on the display device, an undulation of the curved surface being defined by a distance from a virtual plane surface arranged in the virtual three-dimensional space, the image processing apparatus having one or more processors and comprising:

a plane surface division unit for dividing the virtual plane surface into a plurality of polygonal shape regions such that the closer a region is to the virtual camera, the smaller areas the region is divided into, calculating a size evaluation value indicative of a size of an image of each of the plurality of the polygonal shape regions based on a distance of the virtual camera with respect to each of the plurality of the polygonal shape regions, and dividing each of the plurality of the polygonal shape regions such that the calculated size evaluation value becomes equal to or lower than a predetermined threshold value;

a first distance reading unit for reading, from a storage unit, distance information indicative of the distance from the virtual plane surface, with respect to respective vertices of the plurality of polygonal shape regions;

a first coordinate point calculation unit for calculating coordinate points of positions which are respectively distanced from each of the vertices composing the polygons corresponding to the plurality of polygonal shape regions by distances indicated by the distance information read by the first distance reading unit in a direction perpendicular to the virtual plane surface;

a polygon generation unit for generating polygons by using the coordinate points calculated by the first coordinate point calculation unit as polygon vertices defining each of the polygons, the number of the polygons being substantially constant in each of the plurality of the polygonal shape regions; and a drawing unit for drawing an image of the polygons which are generated by the polygon generation unit, the image as being viewed from the virtual camera.

* * * * *